United States Patent
Huang et al.

(10) Patent No.: US 11,546,039 B2
(45) Date of Patent: Jan. 3, 2023

(54) INFORMATION TRANSMISSION METHOD, APPARATUS, FIRST DEVICE AND SECOND DEVICE

(71) Applicant: CHINA ACADEMY OF TELECOMMUNICATIONS TECHNOLOGY, Beijing (CN)

(72) Inventors: Qiuping Huang, Beijing (CN); Runhua Chen, Beijing (CN); Qiubin Gao, Beijing (CN); Pierre Bertrand, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 155 days.

(21) Appl. No.: 16/961,797

(22) PCT Filed: Jan. 9, 2019

(86) PCT No.: PCT/CN2019/070965
§ 371 (c)(1),
(2) Date: Jul. 13, 2020

(87) PCT Pub. No.: WO2019/137390
PCT Pub. Date: Jul. 18, 2019

(65) Prior Publication Data
US 2021/0083746 A1    Mar. 18, 2021

(30) Foreign Application Priority Data
Jan. 12, 2018  (CN) .......................... 201810032176.3

(51) Int. Cl.
*H04B 7/06*    (2006.01)
*H04W 76/19*   (2018.01)
*H04W 72/04*   (2009.01)

(52) U.S. Cl.
CPC ........ *H04B 7/0695* (2013.01); *H04W 72/042* (2013.01); *H04W 72/0446* (2013.01); *H04W 72/0493* (2013.01); *H04W 76/19* (2018.02)

(58) Field of Classification Search
CPC ......... H04B 7/0695; H04B 7/088; H04L 1/00; H04L 1/0023; H04L 5/0007;
(Continued)

(56) References Cited

U.S. PATENT DOCUMENTS 10,826,758 B2 * 11/2020 Huang ................ H04L 25/0202
2019/0053293 A1 * 2/2019 Akoum ................. H04W 24/10
(Continued)

FOREIGN PATENT DOCUMENTS

CN    111492684 A  *  8/2020  ............... H04B 7/06
EP    3706455 A1   *  9/2020  ............... H04B 7/06
(Continued)

OTHER PUBLICATIONS

3GPP TS 38.321, NR, Medium Access Control (MAC) protocol specification, Dec. 2017, Release 15, Version 15.0.0 (Year: 2017).*
(Continued)

*Primary Examiner* — Eric Nowlin
(74) *Attorney, Agent, or Firm* — Harness, Dickey & Pierce, P.L.C.

(57) ABSTRACT

An information transmission method, an apparatus, a first device, and a second device are provided. The information transmission method includes: transmitting a Beam Failure Recovery (BFR) request to a second device in time slot N, and performing a preset reception scheme on control information on a first Control Resource Set (CORESET) starting from time slot N+K; wherein N is an integer greater than or equal to 0, and K is an integer greater than or equal to 0.

15 Claims, 3 Drawing Sheets transmitting a BFR request to a second device in time slot N, and performing a preset reception scheme on control information on a first CORESET starting from time slot N+K; wherein N is an integer greater than or equal to 0, and K is an integer greater than or equal to 0     11

(58) Field of Classification Search
CPC ... H04L 5/0023; H04L 5/0037; H04L 5/0053; H04L 5/006; H04L 5/0094; H04W 16/28; H04W 72/04; H04W 72/042; H04W 72/0446; H04W 72/0493; H04W 72/12; H04W 72/1221; H04W 72/1278; H04W 76/19

See application file for complete search history.

(56) References Cited

U.S. PATENT DOCUMENTS

| | | | | |
|---|---|---|---|---|
| 2019/0182884 | A1* | 6/2019 | Deenoo | H04W 24/08 |
| 2019/0230545 | A1* | 7/2019 | Liou | H04W 16/28 |
| 2019/0306847 | A1* | 10/2019 | Seo | H04L 5/0053 |
| 2019/0349915 | A1* | 11/2019 | Ahn | H04W 72/0413 |
| 2020/0059398 | A1* | 2/2020 | Pan | H04W 72/042 |
| 2020/0344834 | A1* | 10/2020 | Harada | H04W 76/38 |
| 2020/0344835 | A1* | 10/2020 | Wang | H04L 1/1887 |
| 2020/0383060 | A1* | 12/2020 | Park | H04W 52/42 |
| 2021/0014791 | A1* | 1/2021 | Freda | H04W 52/0229 |
| 2021/0058129 | A1* | 2/2021 | Takeda | H04W 74/0833 |
| 2021/0058133 | A1* | 2/2021 | Takeda | H04W 72/042 |
| 2021/0092001 | A1* | 3/2021 | Yoshioka | H04B 7/0617 |
| 2022/0007395 | A1* | 1/2022 | Lei | H04L 5/16 |
| 2022/0217552 | A1* | 7/2022 | Zhang | H04L 5/0032 |
| 2022/0217711 | A1* | 7/2022 | Zhang | H04W 72/0413 |

FOREIGN PATENT DOCUMENTS

| | | | | |
|---|---|---|---|---|
| EP | 3706455 | A4 * | 6/2021 | H04B 7/06 |
| JP | WO2019087360 | A1 * | 11/2017 | H04B 7/06 |
| WO | WO-2017/180336 | A1 | 10/2017 | |
| WO | WO-2018201457 | A1 * | 11/2018 | |
| WO | WO-2019028736 | A1 * | 2/2019 | H04B 7/0695 |
| WO | WO-2019087360 | A1 * | 5/2019 | H04B 7/06 |
| WO | WO-2019096394 | A1 * | 5/2019 | |
| WO | WO-2021062672 | A1 * | 4/2021 | |

OTHER PUBLICATIONS

Vivo et al., WF on handling beam failure recovery for unexpected cases, May 15, 2017, 3GPP TSG RAN WG1 Meeting #89, Hangzhou, P.R. China, Tdoc: R1-1709639 (Year: 2017).*

Huawei et al., Remaining details on beam failure recovery, Nov. 27, 2017, 3GPP TSG RAN WG1 Meeting 91, Reno, USA, Tdoc: R1-1719423 (Year: 2017).*

MediaTek Inc., Further Details on Beam Failure Recovery, Nov. 27, 2017, 3GPP TSG RAN WG1 Meeting 91, Reno, USA, Tdoc: R1-1719566 (Year: 2017).*

AT&T, Remaining Details on Mechanisms to Recover from Beam Failure, Nov. 27, 2017, 3GPP TSG RAN WG1 Meeting 91, Reno, USA, Tdoc: R1-1719633 (Year: 2017).*

Spreadtrum Communications, Remaining issues on beam failure recovery mechanism, Nov. 27, 2017, 3GPP TSG RAN WG1 Meeting 91, Reno, USA, Tdoc: R1-1719695 (Year: 2017).*

Lenovo et al., Discussion of beam failure recovery, Nov. 27, 2017, 3GPP TSG RAN WG1 Meeting 91, Reno, USA, Tdoc: R1-1719735 (Year: 2017).*

Vivo, Remaining details on mechanism to recover from beam failure, Nov. 27, 2017, 3GPP TSG RAN WG1 Meeting 91, Reno, USA, Tdoc: R1-1719770 (Year: 2017).*

Huawei et al., Design of PUCCH-based Beam Failure Recovery, Nov. 27, 2017, 3GPP TSG RAN WG1 Meeting 91, Reno, USA, Tdoc: R1-1719809 (Year: 2017).*

LG Electronics, Discussion on beam failure recovery, Nov. 27, 2017, 3GPP TSG RAN WG1 Meeting 91, Reno, USA, Tdoc: R1-1719908 (Year: 2017).*

Intel Corporation, Remaining Issues on Beam Failure Recovery, Nov. 27, 2017, 3GPP TSG RAN WG1 Meeting 91, Reno, USA, Tdoc: R1-1720072 (Year: 2017).*

CATT, Remaining issues on DL beam recovery, Nov. 27, 2017, 3GPP TSG RAN WG1 Meeting 91, Reno, USA, Tdoc: R1-1720183 (Year: 2017).*

Samsung, Beam failure recovery, Nov. 27, 2017, 3GPP TSG RAN WG1 Meeting 91, Reno, Nevada, USA, Tdoc: R1-1720291 (Year: 2017).*

ASUSTeK, Remaining Issues for Beam Failure Recovery Procedure, Nov. 27, 2017, 3GPP TSG RAN WG1 Meeting 91, Reno, Nevada, USA, Tdoc: R1-1720567 (Year: 2017).*

NEC, On Partial Beam Failure Recovery, Nov. 27, 2017, 3GPP TSG RAN WG1 Meeting 91, Reno, Nevada, USA, Tdoc: R1-1720574 (Year: 2017).*

Sharp, Discussion on mechanisms for beam failure recovery, Nov. 27, 2017, 3GPP TSG RAN WG1 Meeting 91, Reno, Nevada, USA, Tdoc: R1-1720613 (Year: 2017).*

MediaTek [RAN1], LS to RAN2 on Beam Failure Recovery, Nov. 27, 2017, 3GPP TSG RAN WG1 Meeting 91, Reno, Nevada, USA, Tdoc: R1-1721346 (Year: 2017).*

Huawei et al., WF for BFR Candidate Beam Selection, Nov. 27, 2017, 3GPP TSG RAN WG1 Meeting 91, Reno, Nevada, USA, Tdoc: R1-1721670 (Year: 2017).*

MediaTek Inc., Offline discussion summary on remaining issues on Beam Failure Recovery, Nov. 27, 2017, 3GPP TSG RAN WG1 Meeting 91, Reno, Nevada, USA, Tdoc: R1-1721699 (Year: 2017).*

Oppo, Discussion on NR Beam Failure and Radio Link Failure, Oct. 9, 2017, 3GPP TSG-RAN2 Meeting 99bis, Prague, Czech Republic, Tdoc: R2-1710237 (Year: 2017).*

Huawei et al., Handling of resources for beam failure recovery, Oct. 9, 2017, 3GPP TSG-RAN2 Meeting 99bis, Prague, Czech Republic, Tdoc: R2-1710564 (Year: 2017).*

MediaTek Inc. et al., RLM/RLF Considering Beam Failure Recovery, Oct. 9, 2017, 3GPP TSG-RAN2 Meeting 99bis, Prague, Czech Republic, Tdoc: R2-1710881 (Year: 2017).*

Lenovo et al., Dedicated resource configuration for beam failure recovery, Oct. 9, 2017, 3GPP TSG-RAN2 Meeting 99bis, Prague, Czech Republic, Tdoc: R2-1711370 (Year: 2017).*

NEC, RLF declaration after beam recovery failure, Oct. 9, 2017, 3GPP TSG-RAN2 Meeting 99bis, Prague, Czech Republic, Tdoc: R2-1711615 (Year: 2017).*

Panasonic, UL resource configuration for the beam failure recovery, Nov. 27, 2017, 3GPP TSG-RAN WG2 #100, Reno, Nevada, USA, Tdoc: R2-1712407 (Year: 2017).*

Huawei et al., Handling of resources for beam failure recovery, Nov. 27, 2017, 3GPP TSG-RAN WG2 #100, Reno, Nevada, USA, Tdoc: R2-1712563 (Year: 2017).*

Lenovo et al., Dedicated resource configuration for beam failure recovery, Nov. 27, 2017, 3GPP TSG-RAN WG2 #100, Reno, Nevada, USA, Tdoc: R2-1712959 (Year: 2017).*

ZTE Corporation, Discussion on the beam failure recovery impact on RAN2, Nov. 27, 2017, 3GPP TSG-RAN WG2 #100, Reno, Nevada, USA, Tdoc: R2-1713406 (Year: 2017).*

Lenovo et al., Prioritized random access for beam failure recovery, Nov. 27, 2017, 3GPP TSG-RAN WG2 #100, Reno, Nevada, USA, Tdoc: R2-1713688 (Year: 2017).*

OPPO, UL resource allocation and usage for beam failure recovery, Nov. 27, 2017, 3GPP TSG-RAN WG2 #100, Reno, Nevada, USA, Tdoc: R2-1713910 (Year: 2017).*

ZTE Corporation et al., Discussion on the beam failure recovery impacton RAN2, Nov. 27, 2017, 3GPP TSG-RAN WG2 #100, Reno, Nevada, USA, Tdoc: R2-1713954 (Year: 2017).*

Nokia [to be RAN2], LS to RAN1 on beam recovery failure, Nov. 27, 2017, 3GPP TSG-RAN WG2 #100, Reno, Nevada, USA, Tdoc: R2-1714048 (Year: 2017).*

ZTE, offline discussion#18 (on the beam failure recovery impact on RAN2), Nov. 27, 2017, 3GPP TSG-RAN WG2 #100, Reno, Nevada, USA, Tdoc: R2-1714178 (Year: 2017).*

Ericsson, Contention based random access for beam failure recovery, Jan. 22, 2018, 3GPP TSG-RAN WG2 #AH NR 1801, Vancouver, Canada, Tdoc: R2-1800340 (Year: 2018).*

Sharp, Remaining issues on beam failure recovery, Jan. 22, 2018, 3GPP TSG-RAN WG2 #AH NR 1801, Vancouver, Canada, Tdoc: R2-1800560 (Year: 2018).*

(56) References Cited

OTHER PUBLICATIONS

Huawei, Remaining issue for beam failure recovery, Jan. 22, 2018, 3GPP TSG-RAN WG2 #AH NR 1801, Vancouver, Canada, Tdoc: R2-1800632 (Year: 2018).*

Huawei et al., Impacts of new RNTIs on DRX, Jan. 22, 2018, 3GPP TSG-RAN WG2 #AH NR 1801, Vancouver, Canada, Tdoc: R2-1800637 (Year: 2018).*

Huawei et al., Beam failure recovery impacton DRX, Jan. 22, 2018, 3GPP TSG-RAN WG2 #AH NR 1801, Vancouver, Canada, Tdoc: R2-1800640 (Year: 2018).*

MediaTek Inc., RLM/RLF Considering Beam Failure Recovery, Jan. 22, 2018, 3GPP TSG-RAN WG2 #AH NR 1801, Vancouver, Canada, Tdoc: R2-1800646 (Year: 2018).*

Mediatek Inc., Draft CR for beam failure recovery procedure, Jan. 22, 2018, 3GPP TSG-RAN WG2 #AH NR 1801, Vancouver, Canada, Tdoc: R2-1800660 (Year: 2018).*

Media Tek Inc., "Offline discussion summary on remaining issues on Beam Failure Recovery", Agenda Item 7.2.2.4, 3GPP TSG RAN WG1 Meeting #91, R1-1721699, Nov. 27-Dec. 1, 2017, Reno, USA.

Extended European Search Report dated Feb. 5, 2021 for Application No. EP 19 73 8310.2.

International Preliminary Report on Patentability for International Application No. PCT/CN2019/070965 dated Jul. 14, 2020.

Written Opinion of the International Searching Authority for International Application No. PCT/CN2019/070965 dated Mar. 29, 2019.

Vivo, Qualcomm, KT Corp, Ericssonb. "WF on handling beam failure recovery for unexpected cases", 3GPP TSG RAN WG1 Meeting #89, R1-1709639, May 15-19, 2017, Hangzhou, China.

\* cited by examiner transmitting a BFR request to a second device in time slot N, and performing a preset reception scheme on control information on a first CORESET starting from time slot N+K; wherein N is an integer greater than or equal to 0, and K is an integer greater than or equal to 0 — 11

Fig.1 performing a preset transmission scheme on control information on a first CORESET after receiving a BFR request transmitted by a first device — 21

Fig.2

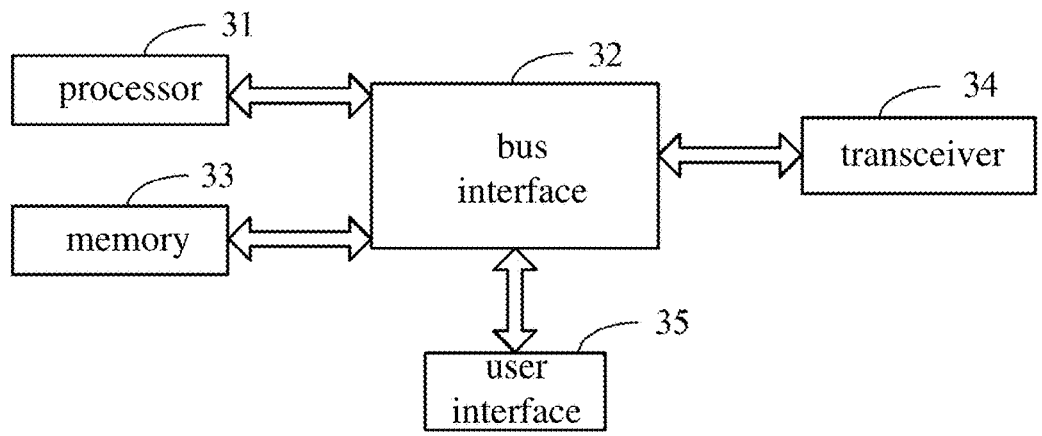

Fig.3

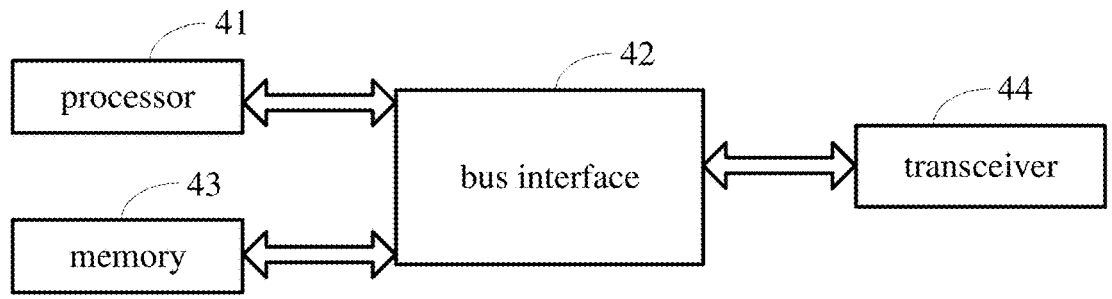

Fig.4

INFORMATION TRANSMISSION METHOD, APPARATUS, FIRST DEVICE AND SECOND DEVICE

CROSS-REFERENCE TO RELATED APPLICATIONS

The present application is the U.S. national phase of PCT Application No. PCT/CN2019/070965 filed on Jan. 9, 2019, which claims a priority to Chinese Patent Application No. 201810032176.3 filed in China on Jan. 12, 2018, the disclosures of which are incorporated herein by reference in their entities.

TECHNICAL FIELD

The present disclosure relates to the field of communication technologies, and in particular, to an information transmission method, an information transmission apparatus, a first device, and a second device.

BACKGROUND

A wireless transmitter with multiple antennas (such as a base station gNB) can form a narrow wireless signal pointing to a specific direction (such as beamforming). Width and direction of a beam can be flexibly adjusted by applying appropriate weights to each antenna unit. Beamforming can be in digital or analog domain. For digital beamforming, each antenna unit has a separate baseband module, and independently control amplitude and phase of a signal transmitted on it. Therefore, a digital beam can be narrowband (for example, with a narrower bandwidth than total system bandwidth). Different digital beams can be multiplexed in time or frequency domain. For analog beamforming, multiple antenna units share same digital baseband module, and each antenna unit has an independent phase shifter. A signal transmitted by each antenna unit can only be adjusted on transmission phase shift (the amplitude cannot be adjust). Therefore, an analog beam is broadband and can only be multiplexed in time domain.

Communication between a transmitter and a receiver needs to include data information and control information, and the control information is used to instruct the receiver how to decode the data information. For example, the control information, such as Downlink Control Information (DCI) in Long Term Evolution (LTE), is transmitted on a physical channel called Physical Downlink Control Channel (PDCCH). Similar to a data channel, the PDCCH can also be beamformed to obtain benefits of spatial diversity gain brought by multiple antennas. A possible PDCCH beamforming method is to divide available time and/or frequency resources into multiple components, each of which is called a Control Resource Set (CORESET). Different transmission beams are used on each CORESET. A PDCCH carrying the DCI can be transmitted on any CORESET. The receiver (such as a terminal or UE) has no information about precise location of PDCCH transmission (such as CORESET), and blind detection of the PDCCH will be performed on all CORESETs. If the PDCCH is explicitly detected on a CORESET, the UE obtains the DCI. The transmitter (such as gNB) can arbitrarily select a CORESET to transmit the PDCCH. If a beam on a CORESET or a subset of a CORESET (such as part of time-frequency resources included in the CORESET, such as one or more search spaces on a CORESET) has poor channel quality, the PDCCH transmitted on the CORESET cannot be successfully decoded by the UE, but if the PDCCH is transmitted on another CORESET with good enough signal quality, the UE can still successfully decode the PDCCH. In this way, spatial diversity of the control information can be achieved. The transmission beam corresponding to each CORESET may be indicated by dynamically signaling or semi-statically configured, and it can be known to the UE before the UE performs PDCCH decoding.

Propagation characteristics of a wireless signal in a mmWave frequency band are different from those in sub 6 GHz (below 6 GHz) bandwidth, because the former has stronger pathloss and blockage. For control channels under different beams (for example, different CORESETs), the UE can detect quality of each control beam to determine whether it is strong enough for reliable control transmission. For this purpose, a network configures M RSs (Reference Signals), corresponding to M CORESETs, each RS uses a same beamforming matrix as a corresponding CORESET for beamforming, and enables the UE to detect channel quality of the PDCCH transmission assumed under the beam. If all beams fail, the UE can report this event to the gNB. Optionally, the UE may also report a new candidate beam that can meet a certain reliability index and can be used for subsequent PDCCH transmission. The new candidate beam can be selected from a group of candidate beams. The UE selects based on measurement results of a set of RS resources configured for new beam selection.

After the UE reports a beam failure event (optionally, including a new beam) to the gNB, the UE starts to detect a gNB response corresponding to the report. The UE can detect the gNB response on a dedicated CORESET (here it is defined as CORESET-Beam Failure Recovery (BFR)). If the UE successfully detects the gNB response on the CORESET-BFR, the beam failure is considered to have been recovered.

However, in the related art, there is no definition of a scheme for the base station to transmit control information on an existing CORESET after a Beam Failure Recovery (BFR) request is reported by the UE, and there is no definition of a scheme for the UE to detect control information on the existing CORESET. As a result, behaviors of the base station and the UE may not match, and a system may not operate properly or system performance is adversely affected.

For example, after the UE transmits a BFR request message to the base station, the base station still continues to transmit the control information on the existing CORESET, but the UE does not detect it, which may cause the UE to lose the control information and fail to perform corresponding data transmission, thereby causing a waste of resources and adversely affecting system performance.

SUMMARY

The present disclosure provides an information transmission method, an apparatus, a first device, and a second device to solve a problem in the related art that after a UE detects a beam failure and reports a BFR request, transmission and reception of control information on an existing CORESET is not defined, resulting in decrease in system performance.

In a first aspect, some embodiments of the present disclosure provide an information transmission method applied to a first device, including: transmitting a BFR request to a second device in time slot N, and performing a preset reception scheme on control information on a first CORE- SET starting from time slot N+K; wherein N is an integer greater than or equal to 0, and K is an integer greater than or equal to 0.

Optionally, the step of performing the preset reception scheme on the control information on the first CORESET starting from the time slot N+K includes: stopping, starting from the time slot N+K, detecting the control information on the first CORESET; or continuing to, starting from the time slot N+K, detect at least part of the control information on the first CORESET.

Optionally, when transmitting the BFR request to the second device in the time slot N or after transmitting the BFR request to the second device in the time slot N, the information transmission method further includes: starting to detect control information transmitted on a second CORESET.

Optionally, the control information transmitted on the second CORESET includes first information that controls the first device to perform control information detection on the first CORESET.

Optionally, when the first information instructs the first device to restart to detect the control information on the first CORESET, and after the step of stopping starting from the time slot N+K detecting the control information on the first CORESET, the information transmission method further includes: after properly decoding the first information, restarting to detect the control information on the first CORESET.

Optionally, during a process of continuing to detect at least part of the control information on the first CORESET, the information transmission method further includes: terminating an ongoing BFR process when a second device response corresponding to the BFR request is detected.

Optionally, the second device response includes control information for reconfiguring a beam on the first CORESET.

Optionally, terminating the ongoing BFR process when the second device response corresponding to the BFR request is detected includes: when the second device response corresponding to the BFR request is detected in the control information on the first CORESET, terminating the ongoing BFR process.

Optionally, in the case that the control information transmitted on the second CORESET is being detected, the second device response includes control information that instructs the first device to stop detecting the control information on the second CORESET, and instructs the first device to monitor a third CORESET, wherein the third CORSET is used to transmit the second device response.

Optionally, during a process of continuing to detect at least part of the control information on the first CORESET, the information transmission method further includes: if a beam corresponding to the first CORESET has been recovered before the BFR process is completed, terminating the ongoing BFR process.

Optionally, when terminating the ongoing BFR process or after terminating the ongoing BFR process, the information transmission method further includes: transmitting a BFR cancellation request to the second device.

Optionally, the beam corresponding to the first CORESET is determined to have been recovered when at least one of the following conditions is met: a condition that a preset quantity of pieces of control information is received on the first CORESET; a condition that it is detected quality of at least one beam corresponding to at least one CORESET or at least one beam corresponding to a preset quantity of CORESETs meets a preset reliability weight.

Optionally, the step of terminating the ongoing BFR process includes: stopping a timer for an uplink signal transmission, wherein the uplink signal transmission is used to notify the second device of a beam failure event.

Optionally, in the case that the control information transmitted on the second CORESET is being detected, the step of terminating the ongoing BFR process includes: stopping detecting the second device response on the second CORESET, wherein the second device response corresponds to the BFR request.

Optionally, when stopping detecting the second device response corresponding to the BFR request on the second CORESET or after stopping detecting the second device response corresponding to the BFR request on the second CORESET, the information transmission method further includes: continuing to detect control information on the second CORESET, and the control information on the second CORESET being used to control unicast uplink data transmission and/or downlink data transmission.

Optionally, the step of continuing to detect the control information on the second CORESET, and the control information on the second CORESET being used to control the unicast uplink data transmission and/or downlink data transmission includes: continuing to detect the control information on the second CORESET according to instruction information transmitted by the second device or pre-configured information, and the control information on the second CORESET being used to control the unicast uplink data transmission and/or downlink data transmission.

Optionally, the step of continuing to, starting from the time slot N+K, detect at least part of the control information on the first CORESET includes at least one of: continuing to, starting from the time slot N+K, detect control information used to schedule signal with at least one preset type on the first CORESET; continuing to, starting from the time slot N+K, detect control information with at least one preset format on the first CORESET; continuing to, starting from the time slot N+K, detect control information with at least one preset aggregation level on the first CORESET; continuing to, starting from the time slot N+K, detect control information corresponding to at least one preset search space on the first CORESET.

In a second aspect, some embodiments of the present disclosure further provide an information transmission method applied to a second device, including: performing a preset transmission scheme on control information on a first CORESET after receiving a BFR request transmitted by a first device.

Optionally, the step of performing the preset transmission scheme on the control information on the first CORESET after receiving the BFR request information transmitted by the first device include: stopping transmitting the control information on the first CORESET after receiving the BFR request transmitted by the first device; or continuing to transmit at least part of the control information on the first CORESET after receiving the BFR request transmitted by the first device.

Optionally, the information transmission method further includes: transmitting control information on a second CORESET.

Optionally, the step of transmitting the control information on the second CORESET includes: starting to transmit the control information on the second CORESET after receiving the BFR request transmitted by the first device.

Optionally, the control information transmitted on the second CORESET includes first information that controls the first device to perform control information detection on the first CORESET.

Optionally, during a process of transmitting the control information on the second CORESET, the information transmission method further includes: configuring the first information to instruct the first device to restart to detect the control information on the first CORESET, and to instruct the first device to start to or continue to transmit the control information on the first CORESET.

Optionally, during a process of continuing to transmit at least part of the control information on the first CORESET after receiving the BFR request transmitted by the first device, the information transmission method further includes: transmitting, to the first device, control information that carries a second device response corresponding to the BFR request.

Optionally, when transmitting to the first device the control information that carries the second device response corresponding to the BFR request or after transmitting to the first device the control information that carries the second device response corresponding to the BFR request, the information transmission method further includes: terminating an ongoing BFR process.

Optionally, transmitting to the first device the control information that carries the second device response corresponding to the BFR request further includes: transmitting, to the first device on the first CORESET, the control information that carries the second device response corresponding to the BFR request.

Optionally, the second device response includes control information for reconfiguring a beam on the first CORESET; and/or the second device response includes control information that instructs the first device to stop detecting the control information on the second CORESET, and instructs the first device to monitor a third CORESET, wherein the third CORSET is used to transmit the second device response.

Optionally, during a process of continuing to transmit at least part of the control information on the first CORESET after receiving the BFR request transmitted by the first device, the information transmission method further includes: receiving a BFR cancellation request transmitted by the first device, and terminating an ongoing BFR process according to the BFR cancellation request.

Optionally, before the step of terminating the ongoing BFR process, the information transmission method further includes: transmitting control information on a second CORESET, the step of terminating the ongoing BFR process includes: stopping transmitting the second device response on the second CORESET, wherein the second device response corresponds to the BFR request.

Optionally, when stopping transmitting the second device response corresponding to the BFR request on the second CORESET or after stopping transmitting the second device response corresponding to the BFR request on the second CORESET, the information transmission method further includes: transmitting instruction information to the first device to instruct the first device to continue to detect the control information on the second CORESET, and the control information on the second CORESET being used to control unicast uplink data transmission and/or downlink data transmission.

Optionally, the step of continuing to transmit at least part of the control information on the first CORESET after receiving the BFR request transmitted by the first device includes at least one of: after receiving the BFR request transmitted by the first device, continuing to transmit control information used to schedule signal with at least one preset type on the first CORESET; after receiving the BFR request transmitted by the first device, continuing to transmit control information with at least one preset format on the first CORESET; after receiving the BFR request transmitted by the first device, continuing to transmit control information with at least one preset aggregation level on the first CORESET; after receiving the BFR request transmitted by the first device, continuing to transmit control information corresponding to at least one preset search space on the first CORESET.

In a third aspect, some embodiments of the present disclosure further provide a first device, including: a memory, a processor, a transceiver, and a computer program stored in the memory and capable of being executed by the processor, wherein the processor is used to execute the computer program to implement steps of: transmitting a BFR request to a second device in time slot N through the transceiver, and performing a preset reception scheme on control information on a first CORESET starting from time slot N+K; wherein N is an integer greater than or equal to 0, and K is an integer greater than or equal to 0.

Optionally, the processor is further used to: stop, starting from the time slot N+K, detecting the control information on the first CORESET; or continue to, starting from the time slot N+K, detect at least part of the control information on the first CORESET.

Optionally, the processor is further used to: when transmitting the BFR request to the second device in the time slot N or after transmitting the BFR request to the second device in the time slot N, start to detect control information transmitted on a second CORESET.

Optionally, the control information transmitted on the second CORESET includes first information that controls the first device to perform control information detection on the first CORESET.

Optionally, when the first information instructs the first device to restart to detect the control information on the first CORESET, the processor is further used to: after stopping starting from the time slot N+K detecting the control information on the first CORESET, restart to detect the control information on the first CORESET after properly decoding the first information.

Optionally, the processor is further used to: during a process of continuing to detect at least part of the control information on the first CORESET, terminate an ongoing BFR process when a second device response corresponding to the BFR request is detected.

Optionally, the second device response includes control information for reconfiguring a beam on the first CORESET.

Optionally, the processor is further used to: during a process of continuing to detect at least part of the control information on the first CORESET, when the second device response corresponding to the BFR request is detected in the control information on the first CORESET, terminate the ongoing BFR process.

Optionally, in the case that the control information transmitted on the second CORESET is being detected, the second device response includes control information that instructs the first device to stop detecting the control information on the second CORESET, and instructs the first device to monitor control information of a third CORESET, wherein the third CORSET is used to transmit the second device response.

Optionally, the processor is further used to: during a process of continuing to detect at least part of the control information on the first CORESET, if a beam corresponding to the first CORESET has been recovered before the BFR process is completed, terminate the ongoing BFR process.

Optionally, the processor is further used to: when terminating the ongoing BFR process or after terminating the ongoing BFR process, transmit a BFR cancellation request to the second device.

Optionally, the beam corresponding to the first CORESET is determined to have been recovered when at least one of the following conditions is met: a condition that a preset quantity of pieces of control information is received on the first CORESET; a condition that it is detected quality of at least one beam corresponding to at least one CORESET or at least one beam corresponding to a preset quantity of CORESETs meets a preset reliability weight.

Optionally, the processor is further used to: stop a timer for an uplink signal transmission, wherein the uplink signal transmission is used to notify the second device of a beam failure event.

Optionally, in the case that the control information transmitted on the second CORESET is being detected, the processor is further used to: stop detecting the second device response on the second CORESET, wherein the second device response corresponds to the BFR request.

Optionally, the processor is further used to: when stopping detecting the second device response corresponding to the BFR request on the second CORESET or after stopping detecting the second device response corresponding to the BFR request on the second CORESET, continuing to detect control information on the second CORESET, wherein the control information on the second CORESET is used to control unicast uplink data transmission and/or downlink data transmission.

Optionally, the processor is further used to: continue to detect the control information on the second CORESET according to instruction information transmitted by the second device or pre-configured information, wherein the control information on the second CORESET is used to control the unicast uplink data transmission and/or downlink data transmission.

Optionally, the processor is further used to: continue to, starting from the time slot N+K, detect control information used to schedule signal with at least one preset type on the first CORESET; and/or continue to, starting from the time slot N+K, detect control information with at least one preset format on the first CORESET; and/or continue to, starting from the time slot N+K, detect control information with at least one preset aggregation level on the first CORESET; and/or continue to, starting from the time slot N+K, detect control information corresponding to at least one preset search space on the first CORESET.

In a fourth aspect, some embodiments of the present disclosure further provide a second device, including: a memory, a processor, a transceiver, and a computer program stored in the memory and capable of being executed by the processor, wherein the processor is used to execute the computer program to implement steps of: performing a preset transmission scheme on control information on a first CORESET after receiving through the transceiver a BFR request transmitted by a first device.

Optionally, the processor is further used to: stop transmitting the control information on the first CORESET after receiving the BFR request transmitted by the first device; or continue to transmit at least part of the control information on the first CORESET after receiving the BFR request transmitted by the first device.

Optionally, the processor is further used to: transmit control information on a second CORESET.

Optionally, the processor is further used to: start to transmit the control information on the second CORESET after receiving the BFR request transmitted by the first device.

Optionally, the control information transmitted on the second CORESET includes first information that controls the first device to perform control information detection on the first CORESET.

Optionally, the processor is further used to: during a process of transmitting the control information on the second CORESET, configure the first information to instruct the first device to restart to detect the control information on the first CORESET, and to instruct the first device to start to or continue to transmit the control information on the first CORESET.

Optionally, the processor is further used to: during a process of continuing to transmit at least part of the control information on the first CORESET after receiving the BFR request transmitted by the first device, transmit, to the first device, control information that carries a second device response corresponding to the BFR request.

Optionally, the processor is further used to: during the process of continuing to transmit at least part of the control information on the first CORESET after receiving the BFR request transmitted by the first device, transmit, to the first device on the first CORESET, the control information that carries the second device response corresponding to the BFR request.

Optionally, the processor is further used to: when transmitting to the first device the control information that carries the second device response corresponding to the BFR request or after transmitting to the first device the control information that carries the second device response corresponding to the BFR request, terminate an ongoing BFR process.

Optionally, the second device response includes control information for reconfiguring a beam on the first CORESET; and/or the second device response includes control information that instructs the first device to stop detecting the control information on the second CORESET, and instructs the first device to monitor control information of a third CORESET, wherein the third CORSET is used to transmit the second device response.

Optionally, the processor is further used to: during a process of continuing to transmit at least part of the control information on the first CORESET after receiving the BFR request transmitted by the first device, receive a BFR cancellation request transmitted by the first device, and terminate an ongoing BFR process according to the BFR cancellation request.

Optionally, the processor is further used to: before terminating the ongoing BFR process, transmit control information on a second CORESET, and the processor is further used to: stop transmitting the second device response on the second CORESET, wherein the second device response corresponds to the BFR request.

Optionally, the processor is further used to: when stopping transmitting the second device response corresponding to the BFR request on the second CORESET or after stopping transmitting the second device response corresponding to the BFR request on the second CORESET, transmit instruction information to the first device to instruct the first device to continue to detect the control information on the second CORESET, wherein the control information on the second CORESET is used to control unicast uplink data transmission and/or downlink data transmission.

Optionally, the processor is further used to: after receiving the BFR request transmitted by the first device, continue to transmit control information used to schedule signal with at least one preset type on the first CORESET; and/or after receiving the BFR request transmitted by the first device, continue to transmit control information with at least one preset format on the first CORESET; and/or after receiving the BFR request transmitted by the first device, continue to transmit control information with at least one preset aggregation level on the first CORESET; and/or after receiving the BFR request transmitted by the first device, continue to transmit control information corresponding to at least one preset search space on the first CORESET.

In a fifth aspect, some embodiments of the present disclosure further provide a computer-readable storage medium storing therein a computer program, wherein the computer program is used to be executed by a processor, to implement steps of the above-mentioned first device side information transmission method.

In a sixth aspect, some embodiments of the present disclosure further provide a computer-readable storage medium storing therein a computer program, wherein the computer program is used to be executed by a processor, to implement steps of the above-mentioned second device side information transmission method.

In a seventh aspect, some embodiments of the present disclosure further provide an information transmission apparatus applied to a first device, including: a first processing module, used to: transmit a BFR request to a second device in time slot N, and perform a preset reception scheme on control information on a first CORESET starting from time slot N+K, wherein N is an integer greater than or equal to 0, and K is an integer greater than or equal to 0.

Optionally, the first processing module includes: a first processing submodule, used to: stop, starting from the time slot N+K, detecting the control information on the first CORESET; or continue to, starting from the time slot N+K, detect at least part of the control information on the first CORESET.

Optionally, the information transmission apparatus further includes: a first detection module, used to: when transmitting the BFR request to the second device in the time slot N or after transmitting the BFR request to the second device in the time slot N, start to detect control information transmitted on a second CORESET.

Optionally, the control information transmitted on the second CORESET includes first information that controls the first device to perform control information detection on the first CORESET.

Optionally, when the first information instructs the first device to restart to detect the control information on the first CORESET, the information transmission apparatus further includes: a second detection module, used to: after stopping starting from the time slot N+K detecting the control information on the first CORESET, restart to detect the control information on the first CORESET after properly decoding the first information.

Optionally, the information transmission apparatus further includes: a second processing module, used to: during a process of continuing to detect at least part of the control information on the first CORESET, terminate an ongoing BFR process when a second device response corresponding to the BFR request is detected.

Optionally, the second device response includes control information for reconfiguring a beam on the first CORESET.

Optionally, the second processing module is further used to: during a process of continuing to detect at least part of the control information on the first CORESET, when the second device response corresponding to the BFR request is detected in the control information on the first CORESET, terminate the ongoing BFR process.

Optionally, in the case that the control information transmitted on the second CORESET is being detected, the second device response includes control information that instructs the first device to stop detecting the control information on the second CORESET, and instructs the first device to monitor control information of a third CORESET, wherein the third CORSET is used to transmit the second device response.

Optionally, the information transmission apparatus further includes: a third processing module, used to: during a process of continuing to detect at least part of the control information on the first CORESET, if a beam corresponding to the first CORESET has been recovered before the BFR process is completed, terminate the ongoing BFR process.

Optionally, the information transmission apparatus further includes: a first transmission module, used to: when terminating the ongoing BFR process or after terminating the ongoing BFR process, transmit a BFR cancellation request to the second device.

Optionally, the beam corresponding to the first CORESET is determined to have been recovered when at least one of the following conditions is met: a condition that a preset quantity of pieces of control information is received on the first CORESET; a condition that it is detected quality of at least one beam corresponding to at least one CORESET or at least one beam corresponding to a preset quantity of CORESETs meets a preset reliability weight.

Optionally, an operation of terminating the ongoing BFR process includes: stopping a timer for an uplink signal transmission, wherein the uplink signal transmission is used to notify the second device of a beam failure event.

Optionally, in the case that the control information transmitted on the second CORESET is being detected, the operation of terminating the ongoing BFR process includes: stopping detecting the second device response on the second CORESET, wherein the second device response corresponds to the BFR request.

Optionally, the information transmission apparatus further includes: a third detection module, used to: when stopping detecting the second device response corresponding to the BFR request on the second CORESET or after stopping detecting the second device response corresponding to the BFR request on the second CORESET, continue to detect control information on the second CORESET, wherein the control information on the second CORESET is used to control unicast uplink data transmission and/or downlink data transmission.

Optionally, the third detection module includes: a first detection submodule, used to: continue to detect the control information on the second CORESET according to instruction information transmitted by the second device or pre-configured information, wherein the control information on the second CORESET is used to control the unicast uplink data transmission and/or downlink data transmission.

Optionally, the first processing submodule is further used to: continue to, starting from the time slot N+K, detect control information used to schedule signal with at least one preset type on the first CORESET; and/or continue to, starting from the time slot N+K, detect control information with at least one preset format on the first CORESET; and/or continue to, starting from the time slot N+K, detect control information with at least one preset aggregation level on the first CORESET; and/or continue to, starting from the time slot N+K, detect control information corresponding to at least one preset search space on the first CORESET.

In an eighth aspect, some embodiments of the present disclosure further provide an information transmission apparatus applied to a second device, including: a fourth processing module, used to: perform a preset transmission scheme on control information on a first CORESET after receiving a BFR request transmitted by a first device.

Optionally, the fourth processing module includes: a second processing submodule, used to: stop transmitting the control information on the first CORESET after receiving the BFR request transmitted by the first device; or continue to transmit at least part of the control information on the first CORESET after receiving the BFR request transmitted by the first device.

Optionally, the information transmission apparatus further includes: a second transmission module, used to transmit control information on a second CORESET.

Optionally, the second transmission module includes: a first transmission submodule, used to: start to transmit the control information on the second CORESET after receiving the BFR request transmitted by the first device.

Optionally, the control information transmitted on the second CORESET includes first information that controls the first device to perform control information detection on the first CORESET.

Optionally, the information transmission apparatus further includes: a fifth processing module, used to: during a process of transmitting the control information on the second CORESET, configure the first information to instruct the first device to restart to detect the control information on the first CORESET, and to instruct the first device to start to or continue to transmit the control information on the first CORESET.

Optionally, the information transmission apparatus further includes: a third transmission module, used to: during a process of continuing to transmit at least part of the control information on the first CORESET after receiving the BFR request transmitted by the first device, transmit, to the first device, control information that carries a second device response corresponding to the BFR request.

Optionally, the third transmission module is further used to: during the process of continuing to transmit at least part of the control information on the first CORESET after receiving the BFR request transmitted by the first device, transmit, to the first device on the first CORESET, the control information that carries the second device response corresponding to the BFR request.

Optionally, the information transmission apparatus further includes: a sixth processing module, used to: when transmitting to the first device the control information that carries the second device response corresponding to the BFR request or after transmitting to the first device the control information that carries the second device response corresponding to the BFR request, terminate an ongoing BFR process.

Optionally, the second device response includes control information for reconfiguring a beam on the first CORESET; and/or the second device response includes control information that instructs the first device to stop detecting the control information on the second CORESET, and instructs the first device to monitor control information of a third CORESET, wherein the third CORSET is used to transmit the second device response.

Optionally, the information transmission apparatus further includes: a seventh processing module, used to: during a process of continuing to transmit at least part of the control information on the first CORESET after receiving the BFR request transmitted by the first device, receive a BFR cancellation request transmitted by the first device, and terminate an ongoing BFR process according to the BFR cancellation request.

Optionally, the information transmission apparatus further includes: a fourth transmission module, used to: before terminating the ongoing BFR process, transmit control information on a second CORESET; and the operation of terminating the ongoing BFR process includes: stopping transmitting the second device response on the second CORESET, wherein the second device response corresponds to the BFR request.

Optionally, the information transmission apparatus further includes: a fifth transmission module, used to: when stopping transmitting the second device response corresponding to the BFR request on the second CORESET or after stopping transmitting the second device response corresponding to the BFR request on the second CORESET, transmit instruction information to the first device to instruct the first device to continue to detect the control information on the second CORESET, wherein the control information on the second CORESET is used to control unicast uplink data transmission and/or downlink data transmission.

Optionally, the second processing submodule is further used to: after receiving the BFR request transmitted by the first device, continue to transmit control information used to schedule signal with at least one preset type on the first CORESET; and/or after receiving the BFR request transmitted by the first device, continue to transmit control information with at least one preset format on the first CORESET; and/or after receiving the BFR request transmitted by the first device, continue to transmit control information with at least one preset aggregation level on the first CORESET; and/or after receiving the BFR request transmitted by the first device, continue to transmit control information corresponding to at least one preset search space on the first CORESET.

Beneficial effects of the above technical solutions of the present disclosure are as follows: in the above scheme, with respect to the information transmission method, it transmits the BFR request to the second device in the time slot N, and performs the preset reception scheme on the control information on the first CORESET starting from the time slot N+K; wherein, N is an integer greater than or equal to 0, and K is an integer greater than or equal to 0; this can to a certain extent prevent the system from not operating properly or prevent system performance degradation caused by behavior mismatch between a base station and a UE; and this can resolve the problem in the related art that after the UE detects a beam failure and reports a BFR request, transmission and reception of the control information on the existing CORESET is not defined, resulting in decrease in system performance.

BRIEF DESCRIPTION OF THE DRAWINGS

FIG. 1 is a first schematic flowchart of an information transmission method according to some embodiments of the present disclosure;

FIG. 2 is a second schematic flowchart of an information transmission method according to some embodiments of the present disclosure;

FIG. 3 is a schematic structural diagram of a first device according to some embodiments of the present disclosure;

FIG. 4 is a schematic structural diagram of a second device according to some embodiments of the present disclosure;

DETAILED DESCRIPTION

Figure 5:
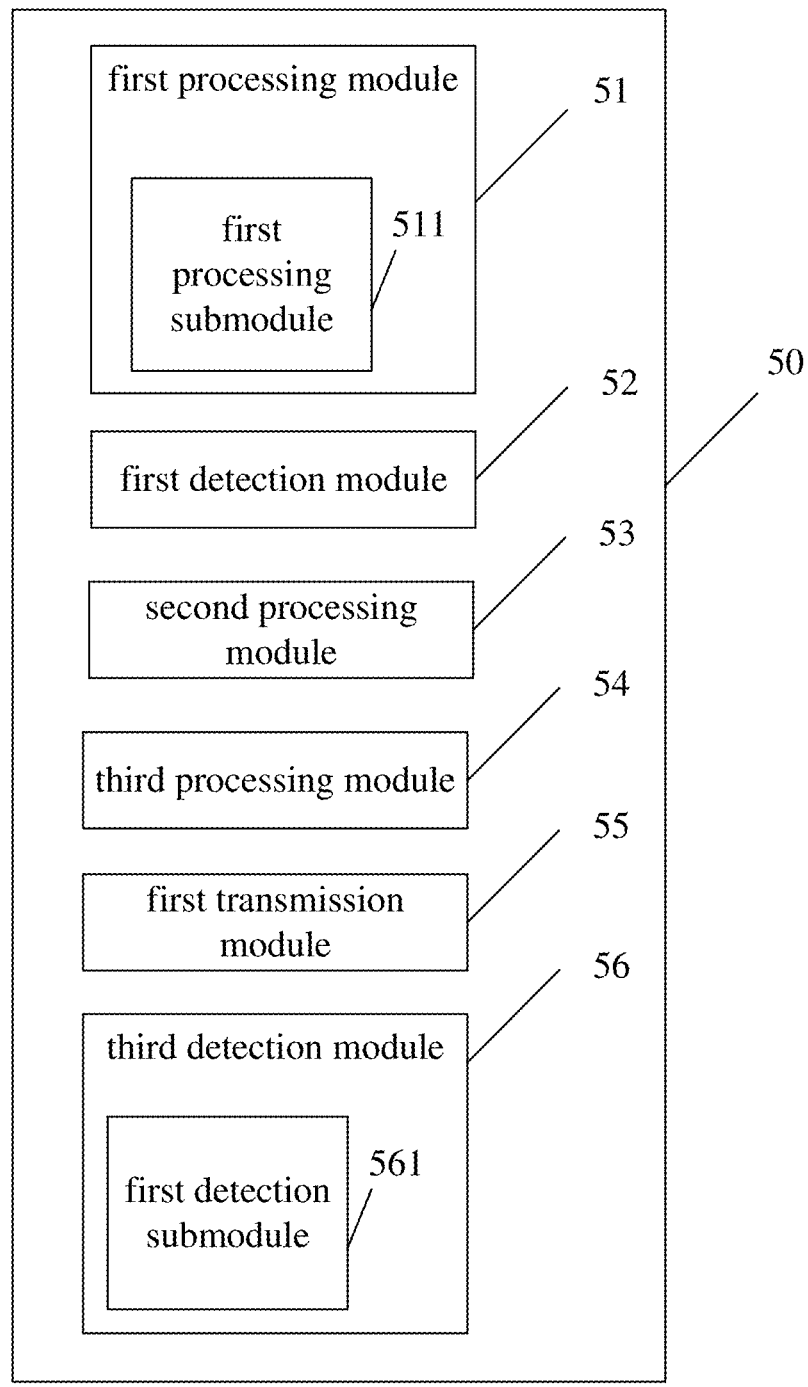
FIG. 5 is a first schematic structural diagram of an information transmission apparatus according to some embodiments of the present disclosure.

In the following, in order to make technical problems, technical solutions, and advantages to be solved by the present disclosure clearer, the embodiments of the present disclosure will be described in details in combination with the accompanying drawings.

In view of a problem in the related art that after a UE detects a beam failure and reports a BFR request, transmission and reception of control information on an existing CORESET is not defined, resulting in decrease in system performance, the present disclosure provides an information transmission method applied to a first device. As shown in FIG. 1, the information transmission method includes: step 11: transmitting a BFR request to a second device in time slot N, and performing a preset reception scheme on control information on a first CORESET starting from time slot N+K; wherein N is an integer greater than or equal to 0, and K is an integer greater than or equal to 0. K may be a value agreed by the first device and the second device, or may be a configuration value configured by the second device.

In the information transmission method provided by some embodiments of the present disclosure, it transmits the BFR request to the second device in the time slot N, and performs the preset reception scheme on the control information on the first CORESET starting from the time slot N+K; wherein, N is an integer greater than or equal to 0, and K is an integer greater than or equal to 0; this can to a certain extent prevent the system from not operating properly or prevent system performance degradation caused by behavior mismatch between a base station and a terminal (i.e., UE); and this can resolve the problem in the related art that after the UE detects a beam failure and reports a BFR request, transmission and reception of the control information on the existing CORESET is not defined, resulting in decrease in system performance.

The first device may be a terminal, and the second device may be a base station; the first CORESET may be all CORESETs being monitored before the terminal starts BFR, or it may also be a CORESET other than a CORESET-BFR configured by the terminal, or it may also be a CORESET with a search space configured thereon, or it may also be a CORESET corresponding to a beam detection failure. Optionally, the first CORESET is a CORESET currently being monitored by the terminal and with respect to which the beam detection fails. The first CORESET may include one CORESET or multiple CORESETs, which is not limited herein.

The control information may be transmitted on a PDCCH, and the terminal receives within a configured CORESET the control information transmitted in the PDCCH. The control information may not only be transmitted on the PDCCH, but also may be transmitted on other channels similar to the PDCCH, such as Enhanced PDCCH (EPDCCH) (for example, named XPDCCH), which is not limited herein.

Specifically, the step of performing the preset reception scheme on the control information on the first CORESET starting from the time slot N+K includes: stopping, starting from the time slot N+K, detecting the control information on the first CORESET; or continuing to, starting from the time slot N+K, detect at least part of the control information on the first CORESET.

Further, when transmitting the BFR request to the second device in the time slot N or after transmitting the BFR request to the second device in the time slot N, the information transmission method further includes: starting to detect control information transmitted on a second CORESET.

The second CORESET may include one CORESET or multiple CORESETs, which is not limited herein.

The second CORESET may be optionally a CORESET-BFR, and the second CORESET (CORESET-BFR) is used to transmit control information for controlling unicast transmission or is used to transmit control information for controlling broadcast transmission.

In some embodiments of the present disclosure, the control information transmitted on the second CORESET includes first information that controls the first device to perform control information detection on the first CORESET.

When the first information instructs the first device to restart to detect the control information on the first CORESET, and after the step of stopping starting from the time slot N+K detecting the control information on the first CORESET, the information transmission method further includes: after properly decoding the first information, restarting to detect the control information on the first CORESET.

During a process of continuing to, starting from the time slot N+K, detect at least part of the control information on the first CORESET, it may cause termination of a BFR process. Some embodiments of the present disclosure provide the following two examples:

In a first example, during a process of continuing to detect at least part of the control information on the first CORESET, the information transmission method further includes: terminating an ongoing BFR process when a second device response corresponding to the BFR request is detected.

The second device response may be a base station response (which may include a response for the BFR, or may include other responses for a beam failure request). The second device response includes control information for reconfiguring a beam on the first CORESET (the control information being used to reconfigure a corresponding beam for the first CORESET), and/or includes control information that instructs the first device to stop detecting the control information on the second CORESET, and instructs the first device to switch to monitor a third CORESET for transmitting the second device response (that is, control information that instructs the terminal to detect the second device response on another CORESET (corresponding to the third CORESET) other than the CORESET-BFR (corresponding to the second CORESET)).

Optionally, terminating the ongoing BFR process when the second device response corresponding to the BFR request is detected further includes: when the second device response corresponding to the BFR request is detected in the control information on the first CORESET, terminating the ongoing BFR process.

In a case that the control information transmitted on the second CORESET is being detected, the second device response includes the latter kind of control information (i.e., the control information that instructs the first device to stop detecting the control information on the second CORESET, and instructs the first device to switch to monitor the third CORESET for transmitting the second device response).

The third CORESET may include one CORESET or multiple CORESETs, which is not limited herein. The third CORESET is another CORESET used to transmit the second device response.

In a second example, during a process of continuing to detect at least part of the control information on the first CORESET, the information transmission method further includes: when a beam corresponding to the first CORESET has been recovered before the BFR process is completed, terminating an ongoing BFR process.

Further, when terminating the ongoing BFR process or after terminating the ongoing BFR process, the information transmission method further includes: transmitting a BFR cancellation request to the second device.

The beam corresponding to the first CORESET is determined to have been recovered when at least one of the following conditions is met: a condition that a preset quantity of pieces of control information is received on the first CORESET; a condition that it is detected quality of at least one beam corresponding to at least one CORESET or at least one beam corresponding to a preset quantity of CORESETs meets a preset reliability weight.

That is, before completion of the BFR, if the preset quantity of pieces of control information is received on the first CORESET, and/or, it is detected that beam quality of the beam corresponding to the at least one CORESET or the beam corresponding to the preset quantity of CORESETs meets the preset reliability weight, it is determined that the beam corresponding to the first CORESET has been recovered, and the first device terminates the ongoing BFR process.

Specifically, the step of terminating the ongoing BFR process includes: stopping detecting the second device response corresponding to the BFR request on the second CORESET; and/or stopping a timer for an uplink signal transmission, wherein the uplink signal transmission is used to notify the second device of a beam failure event. It is applicable to the first example and the second example described above.

In the case that the control information transmitted on the second CORESET is being detected, the step of terminating the ongoing BFR process includes a former kind of operation (i.e., stopping detecting the second device response corresponding to the BFR request on the second CORESET).

Further, when stopping detecting the second device response corresponding to the BFR request on the second CORESET or after stopping detecting the second device response corresponding to the BFR request on the second CORESET (which may include stopping detecting a time slot for a response on the second CORESET), the information transmission method further includes: continuing to detect control information on the second CORESET, and the control information on the second CORESET being used to control unicast uplink data transmission and/or downlink data transmission.

The step of continuing to detect the control information on the second CORESET, and the control information on the second CORESET being used to control the unicast uplink data transmission and/or downlink data transmission includes: continuing to detect the control information on the second CORESET according to instruction information transmitted by the second device or pre-configured information, and the control information on the second CORESET being used to control the unicast uplink data transmission and/or downlink data transmission.

Specifically, the step of continuing to, starting from the time slot N+K, detect at least part of the control information on the first CORESET includes at least one of: continuing to, starting from the time slot N+K, detect control information used to schedule a preset type of signal on the first CORESET; continuing to, starting from the time slot N+K, detect control information with a preset format on the first CORESET; continuing to, starting from the time slot N+K, detect control information with a preset aggregation level on the first CORESET; continuing to, starting from the time slot N+K, detect control information corresponding to a preset search space on the first CORESET.

Some embodiments of the present disclosure also provide an information transmission method applied to a second device. As shown in FIG. 2, the information transmission method includes: step 21: performing a preset transmission scheme on control information on a first CORESET after receiving a BFR request transmitted by a first device.

In the information transmission method provided by some embodiments of the present disclosure, it performs the preset transmission scheme on the control information on the first CORESET after receiving the BFR request transmitted by the first device; this can to a certain extent prevent the system from not operating properly or prevent system performance degradation caused by behavior mismatch between a base station and a UE; and this can resolve the problem in the related art that after the UE detects a beam failure and reports a BFR request, transmission and reception of the control information on the existing CORESET is not defined, resulting in decrease in system performance.

The first device may be a terminal, and the second device may be a base station; the first CORESET may be all CORESETs being monitored before the terminal starts BFR, or it may also be a CORESET other than a CORESET-BFR configured by the terminal, or it may also be a CORESET with a search space configured thereon, or it may also be a CORESET corresponding to a beam detection failure. Optionally, the first CORESET is a CORESET currently being monitored by the terminal and with respect to which the beam detection fails. The first CORESET may include one CORESET or multiple CORESETs, which is not limited herein.

The control information may be transmitted on a PDCCH, and the terminal receives within a configured CORESET the control information transmitted in the PDCCH. The control information may not only be transmitted on the PDCCH, but also may be transmitted on other channels similar to the PDCCH, such as EPDCCH (for example, named XPDCCH), which is not limited herein.

Specifically, the step of performing the preset transmission scheme on the control information on the first CORESET after receiving the BFR request information transmitted by the first device includes: stopping transmitting the control information on the first CORESET after receiving the BFR request transmitted by the first device; or continuing to transmit at least part of the control information on the first CORESET after receiving the BFR request transmitted by the first device.

Further, the information transmission method further includes: transmitting control information on a second CORESET.

The second CORESET may include one CORESET or multiple CORESETs, which is not limited herein.

The second CORESET may be optionally a CORESET-BFR, and the second CORESET (CORESET-BFR) is used to transmit control information for controlling unicast transmission or is used to transmit control information for controlling broadcast transmission.

Specifically, the step of transmitting the control information on the second CORESET includes: starting to transmit the control information on the second CORESET after receiving the BFR request transmitted by the first device.

In some embodiments of the present disclosure, the control information transmitted on the second CORESET includes first information that controls the first device to perform control information detection on the first CORESET.

Further, during a process of transmitting the control information on the second CORESET, the information transmission method further includes: configuring the first information to instruct the first device to restart to detect the control information on the first CORESET, and to instruct the first device to start to (corresponding to a scenario where a period of interruption appears) or continue to transmit the control information on the first CORESET.

During a process of continuing to transmit at least part of the control information on the first CORESET after receiving the BFR request transmitted by the first device, it may cause termination of a BFR process. Some embodiments of the present disclosure provide the following two examples:

In a first example, during a process of continuing to transmit at least part of the control information on the first CORESET after receiving the BFR request transmitted by the first device, the information transmission method further includes: transmitting, to the first device, control information that carries a second device response corresponding to the BFR request.

The second device response may be a base station response (which may include a response for the BFR, or may include other responses for a beam failure request). The second device response includes control information for reconfiguring a beam on the first CORESET (the control information being used to reconfigure a corresponding beam for the first CORESET), and/or includes control information that instructs the first device to stop detecting the control information on the second CORESET, and instructs the first device to switch to monitor a third CORESET for transmitting the second device response (that is, control information that instructs the terminal to detect the second device response on another CORESET (corresponding to the third CORESET) other than the CORESET-BFR (corresponding to the second CORESET)).

Optionally, transmitting to the first device the control information that carries the second device response corresponding to the BFR request includes: transmitting, to the first device on the first CORESET, the control information that carries the second device response corresponding to the BFR request.

The third CORESET may include one CORESET or multiple CORESETs, which is not limited herein.

As is explained here, the above second device response is not only applicable in a scenario of transmitting the control information on the first CORESET, but also applicable in a scenario of transmitting the control information on the second CORESET (CORESET-BFR), which is not limited herein.

Further, when transmitting to the first device the control information that carries the second device response corresponding to the BFR request or after transmitting to the first device the control information that carries the second device response corresponding to the BFR request, the information transmission method further includes: terminating an ongoing BFR process.

In a second example, during a process of continuing to transmit at least part of the control information on the first CORESET after receiving the BFR request transmitted by the first device, the information transmission method further includes: receiving a BFR cancellation request transmitted by the first device, and terminating an ongoing BFR process according to the BFR cancellation request.

Further, before the step of terminating the ongoing BFR process, the information transmission method further includes: transmitting control information on a second CORESET; correspondingly, the step of terminating the ongoing BFR process includes: stopping transmitting the second device response corresponding to the BFR request on the second CORESET. It is applicable to the first example and the second example described above.

Optionally, the step of terminating the ongoing BFR process includes: normally transmitting the control information on the first CORESET, that is, in a manner of transmitting the control information on the first CORESET before receiving the BFR request. For example, there is no type restriction on the control information transmitted on the first CORESET before receiving the BFR request, and after receiving the BFR request, only certain types of control information can be transmitted on the first CORESET, then the step of terminating the ongoing BFR process include: there is no type restriction on the control information transmitted on the first CORESET after receiving the BFR request. It is applicable to the first example and the second example described above.

Further, when stopping transmitting the second device response corresponding to the BFR request on the second CORESET or after stopping transmitting the second device response corresponding to the BFR request on the second CORESET (which may include stopping transmitting a time slot for a response on the second CORESET), the information transmission method further includes: transmitting the control information on the second CORESET, and the control information on the second CORESET being used to control unicast uplink data transmission and/or downlink data transmission.

Further, when stopping transmitting the second device response corresponding to the BFR request on the second CORESET or after stopping transmitting the second device response corresponding to the BFR request on the second CORESET (which may include stopping transmitting a time slot for a response on the second CORESET), the information transmission method further includes: transmitting instruction information to the first device to instruct the first device to continue to detect the control information on the second CORESET, and the control information on the second CORESET being used to control unicast uplink data transmission and/or downlink data transmission.

Specifically, the step of continuing to transmit at least part of the control information on the first CORESET after receiving the BFR request transmitted by the first device includes at least one of: after receiving the BFR request transmitted by the first device, continuing to transmit control information used to schedule a preset type of signal on the first CORESET; after receiving the BFR request transmitted by the first device, continuing to transmit control information with a preset format on the first CORESET; after receiving the BFR request transmitted by the first device, continuing to transmit control information with a preset aggregation level on the first CORESET; after receiving the BFR request transmitted by the first device, continuing to transmit control information corresponding to a preset search space on the first CORESET.

The information transmission method provided by some embodiments of the present disclosure will be further described below in combination with both sides of the first device (taking the terminal as an example) and the second device (taking the base station as an example, correspondingly, with respect to the second device response, taking the base station response as an example), wherein with respect to the first CORESET, taking the CORESET currently being monitored by the terminal and to which the beam detection fails as an example (hereinafter referred to as an existing CORESET), with respect to the second CORESET, taking the CORESET-BFR as an example, and with respect to the third CORESET, taking another CORESET other than the CORESET-BFR as an example (hereinafter referred to as the other CORESET).

In view of the above technical problems, in the scheme provided by some embodiments of the present disclosure, a to-be-solve problem being considered is whether the UE continues to detect the control information on the existing CORESET/beam (currently being monitored) after the BFR process is started. The beam failure is monitored on the existing CORESET (in fact, it is achieved by detecting quality of a reference signal corresponding to the existing CORESET), which means that signal quality of transmission of control information on any existing CORESET is not reliable enough in theory. On the other hand, transmission of a "one-shot" PDCCH on the existing CORESET may be successfully decoded, but a probability of occurrence of such kind of event is very small. In addition, there is also a possibility that the beam on the existing CORESET can recover from deep fading and become reliable again before the BFR response (corresponding to the base station response of the BFR request) is successfully detected on CORESET-BFR.

Therefore, the UE may continue to detect the control information (for example, continue to detect the PDCCH) on the existing CORESET, or stop detecting the control information (for example, stop detecting the PDCCH) after the BFR process is started. Therefore, the scheme provided by some embodiments of the present disclosure mainly includes the following two parts.

The first part is with respect to stop detecting the control information on the existing CORESET.

After the UE starts the BFR (and starts to monitor the CORESET-BFR) (that is, after the UE transmits the BFR request; or after the UE transmits the BFR request and starts to detect the control information on the CORESET-BFR), the UE stops detecting the control information on the existing CORESET. This is relatively simple for the UE to implement and can reduce power consumption of the UE (a corresponding behavior of the base station may be that: the base station stops transmitting the control information on the existing CORESET after receiving BFR request information transmitted by the UE).

Once the UE starts the BFR, the UE detects the control information transmitted on the CORESET-BFR. The CORESET-BER can be used for unicast transmission of the control information (including conventional Uplink (UL) and/or Downlink (DL) data, RRC reconfiguration information of the UE, and the like), and can also be used for broadcast transmission of the control information. From the view point of function, there is no need for any type of restrictions on which services the control information on the CORESET-BFR corresponds to.

In an embodiment, the control information transmitted on the CORESET-BER can be used to restart the UE's detection of the control information on the CORESET. More specifically, the control information transmitted on the CORESET-BER can be used to control the UE's control information detection behavior on the existing CORESET.

For example, after starting the BFR, the UE may stop detection of the control information on the existing CORESET until the control information transmitted on the CORESET-BFR (for example, the control information carried on the PDCCH of the CORESET-BFR) explicitly configures the UE to restart monitoring of the existing CORESET.

A corresponding behavior of the base station may be that: after receiving the BFR request from the UE, the base station stops transmitting the control information on the existing CORESET, and the base station may not continue to transmit the control information on the existing CORESET until the base station carries information that controls the UE to restart the detection of the control information on the existing CORESET in the control information of the CORESET-BFR.

The second part is with respect to continue to monitor the CORESET.

After the UE starts the BFR, the UE continues to detect the PDCCH on the existing CORESET (a corresponding behavior of the base station is that: the base station continues to transmit the control information on the existing CORESET after receiving the BFR request information transmitted by the UE).

In an embodiment, the UE continues to detect all control information on the existing CORESET that has been continuously monitored. In another embodiment, the UE detects part of the control information on the existing CORESET that has been continuously monitored (a corresponding behavior of the base station is that: the base station transmits part or all of the control information on the existing CORESET after receiving the BFR request information transmitted by the UE).

For a latter case, some embodiments of the present disclosure are as follows.

In an embodiment, the UE detects control information that can be used to schedule a certain type of information (or the UE detects the PDCCH that can be used to transmit control information that schedules a certain type of information), and does not detect other control information (or the UE does not detect the PDCCH that used to transmit control information that schedules other types of information). For example, the UE detects control information that can be used for unicast data transmission. In another embodiment, the UE detects control information that can be used to transmit a gNB response corresponding to the BFR request. The gNB response here may be control information that schedules the UE to reconfigure transmission of the existing CORESET and/or the CORESET-BFR. As another example, the UE detects control information on the existing CORESET that explicitly indicates to start or stop control information detection on the existing CORESET and/or the CORESET-BFR.

In another embodiment, the UE detects control information with a specific format (such as the PDCCH for transmission in a certain DCI format), and stops detecting control information with other formats (such as the PDCCH for transmission in another certain DCI format). For example, the UE detects a fallback PDCCH (for example, a PDCCH format for RRC reconfiguration; specifically, for example, a PDCCH carrying DCI format 0-0 and/or DCI format 1-0).

In another embodiment, the UE detects control information of one or more certain aggregation levels (such as a PDCCH with a certain or a certain kind of aggregation level), and does not detect control information of other aggregation levels (such as a PDCCH with another certain or another certain kind of aggregation level). For example, the UE detects control information with the highest aggregation level on the existing CORESET (such as a PDCCH with the highest aggregation level). A set aggregation levels of control information (such as a PDCCH of another aggregation level) that the UE continues to detect on the existing CORESET may be fixed or pre-configured.

In another embodiment, the UE detects control information corresponding to a specific search space (such as a PDCCH corresponding to a specific search space), and does not detect control information corresponding to other specific search spaces (such as a PDCCH corresponding to a specific search space).

In some embodiments of the present disclosure, the control information detected by the UE may be any combination of the above examples, which is not limited herein.

As is explained here, at this moment, the UE has started the BFR, and detects control information on the CORESET and the CORESET-BFR simultaneously. There might be a scenario where the reception of the control information (or the PDCCH) on the existing CORESET will terminate the ongoing BFR process. Examples are as follows.

Scenario 1: the control information (or the PDCCH) on the existing CORESET carries the gNB response for a beam failure process (a corresponding behavior of the base station is that: the base station carries the gNB response corresponding to the BFR request in the control information transmitted on the existing CORESET). At this time, the gNB response may be transmitted on the existing CORESET or CORESET-BFR. If the gNB response is received on the existing CORESET, the BFR process can be terminated. This gNB response can be: control information (or PDCCH) for reconfiguring a beam on the existing CORESET, and/or control information (or PDCCH) that instructs the UE to stop monitoring the CORESET-BFR (that is, stop detecting the control information on the CORESET-BFR), and instructs the UE to switch to monitor other CORESET for transmitting the gNB response.

Scenario 2: before the BFR is completed, a beam corresponding to the existing CORESET recovers (has already been recovered) by itself, and reliable control channel transmission may be performed again. In this case, the UE may transmit a BFR cancellation request (that is, a request to cancel the BFR) to the base station, requesting the base station to terminate the BFR process. After receiving the information, the base station stops the BFR.

To determine that the beam corresponding to the existing CORESET has been restored, the UE needs a criterion (for example, setting a certain performance index) for determination. Some possible ways are as follows: a preset quantity of PDCCHs are successfully received on the existing CORESET; and/or it is detected that beam quality of at least one beam (i.e. CORESET) or a preset quantity of beams becomes sufficiently reliable (it can be determined according to a preset reliability weight, which can include a upper bound of Block Error Rate (BLER) of the PDCCH and/or a lower bound of Reference Signal Received Power (RSRP) of the PDCCH).

In the above two scenarios, the UE may also terminate the ongoing BFR process. This means: (1) The UE stops detecting the gNB response corresponding to the BFR on the CORESET-BFR (a possible corresponding behavior of the base station may be in that: the base station stops transmitting the gNB response corresponding to the BFR on the CORESET-BFR); however, the UE may still continue to detect the control information on the CORESET-BFR, wherein the control information on the CORESET-BFR is used to control unicast UL/DL data transmission; whether the UE does so depends on the system (for example, the base station transmits instruction information), or the UE being pre-configured; (2) The UE stops a timer, wherein the timer is used to notify the gNB of uplink signal transmission of the beam failure event.

As can be seen from the above, in some embodiments of the present disclosure, it provide a scheme for the base station to transmit the control information on the existing CORESET after the UE reports the BFR request, and a scheme for the UE to detect the control information on the existing CORESET (reception scheme), and it appropriately avoids possible behavior mismatch between the base station and the UE, and prevents from occurring a situation where the system may not operate properly or the system performance is adversely affected.

Some embodiments of the present disclosure also provide a first device, including a memory, a processor, a transceiver, and a computer program stored in the memory and capable of being executed by the processor, wherein the processor is used to execute the computer program to implement steps of: transmitting a BFR request to a second device in time slot N through the transceiver, and performing a preset reception scheme on control information on a first CORESET starting from time slot N+K; wherein N is an integer greater than or equal to 0, and K is an integer greater than or equal to 0.

The first device provided by some embodiments of the present disclosure transmits the BFR request to the second device in the time slot N, and performs the preset reception scheme on the control information on the first CORESET starting from the time slot N+K; wherein, N is an integer greater than or equal to 0, and K is an integer greater than or equal to 0; this can to a certain extent prevent the system from not operating properly or prevent system performance degradation caused by behavior mismatch between a base station and a UE; and this can resolve the problem in the related art that after the UE detects a beam failure and reports a BFR request, transmission and reception of the control information on the existing CORESET is not defined, resulting in decrease in system performance.

Specifically, as shown in FIG. 3, a first device provided by some embodiments of the present disclosure includes: a processor 31; and a memory 33 connected with the processor 31 through a bus interface 32, and the memory 33 is used to store programs and data used by the processor 31 when performing operations. The processor 31 is used to call and execute the programs and the data stored in the memory 33 to perform the following process: transmitting a BFR request to a second device in time slot N through a transceiver 34, and performing a preset reception scheme on control information on a first CORESET starting from time slot N+K; wherein N is an integer greater than or equal to 0, and K is an integer greater than or equal to 0.

The transceiver 34 is connected with the bus interface 32 and is used to receive and transmit data under control of the processor 31.

It should be noted that in FIG. 3, bus architecture may include any quantity of interconnected buses and bridges, specifically linked together by various circuits such as one or more processors represented by the processor 31 and the memory represented by the memory 33. The bus architecture may also link together various other circuits such as peripheral devices, voltage regulators, and power management circuits, etc., which are well known in the art, and therefore, they will not be further described in this document. The bus interface is provided. The transceiver 34 may be a plurality of elements, that is, including a transmitter and a transceiver, and provides a unit for communicating with various other devices on a transmission medium. For different first devices, the user interface 35 may also be an interface capable of externally or internally connecting to a required device. The connected device includes but are not limited to a keypad, a display, a speaker, a microphone, a joystick, and so on. The processor 31 is responsible for managing the bus architecture and general processing, and the memory 33 may store data used by the processor 31 when performing operations.

It can be understood by a person skilled in the art that all or part of the steps to implement the above embodiments can be implemented by hardware, or can be implemented by related hardware being instructed through a computer program, and the computer program includes instructions to perform part or all of the steps of the above method; and the computer program may be stored in a readable storage medium, which may be any form of storage medium, such as a volatile memory or a non-volatile memory, or may include both the volatile and non-volatile memories.

The processor is further used to: stop, starting from the time slot N+K, detecting the control information on the first CORESET; or continue to, starting from the time slot N+K, detect at least part of the control information on the first CORESET.

Further, the processor is further used to: when transmitting the BFR request to the second device in the time slot N or after transmitting the BFR request to the second device in the time slot N, start to detect control information transmitted on a second CORESET.

In some embodiments of the present disclosure, the control information transmitted on the second CORESET includes first information that controls the first device to perform control information detection on the first CORESET.

When the first information instructs the first device to restart to detect the control information on the first CORESET, the processor is further used to: after stopping starting from the time slot N+K detecting the control information on the first CORESET, restart to detect the control information on the first CORESET after properly decoding the first information.

During a process of continuing to, starting from the time slot N+K, detect at least part of the control information on the first CORESET, it may cause termination of a BFR process. Some embodiments of the present disclosure provide the following two examples:

In a first example, the processor is further used to: during a process of continuing to detect at least part of the control information on the first CORESET, terminate an ongoing BFR process when a second device response corresponding to the BFR request is detected.

The second device response includes control information for reconfiguring a beam on the first CORESET, and/or includes control information that instructs the first device to stop detecting the control information on the second CORESET, and instructs the first device to switch to monitor control information of a third CORESET for transmitting the second device response.

Optionally, the processor is further used to: during a process of continuing to detect at least part of the control information on the first CORESET, when the second device response corresponding to the BFR request is detected in the control information on the first CORESET, terminate the ongoing BFR process.

In the case that the control information transmitted on the second CORESET is being detected, the second device response includes a latter kind of control information (the control information that instructs the first device to stop detecting the control information on the second CORESET, and instructs the first device to switch to monitor the third CORESET for transmitting the second device response).

In a second example, the processor is further used to: during a process of continuing to detect at least part of the control information on the first CORESET, when a beam corresponding to the first CORESET has been recovered before the BFR process is completed, terminate an ongoing BFR process.

Further, the processor is further used to: when terminating the ongoing BFR process or after terminating the ongoing BFR process, transmit a BFR cancellation request to the second device.

The beam corresponding to the first CORESET is determined to have been recovered when at least one of the following conditions is met: a condition that a preset quantity of pieces of control information is received on the first CORESET; a condition that it is detected quality of at least one beam corresponding to at least one CORESET or at least one beam corresponding to a preset quantity of CORESETs meets a preset reliability weight.

Specifically, the processor is further used to: stop detecting the second device response corresponding to the BFR request on the second CORESET; and/or stop a timer for an uplink signal transmission, wherein the uplink signal transmission is used to notify the second device of a beam failure event.

In the case that the control information transmitted on the second CORESET is being detected, the step of terminating the ongoing BFR process includes a former kind of operation (stopping detecting the second device response corresponding to the BFR request on the second CORESET).

Further, the processor is further used to: when stopping detecting the second device response corresponding to the BFR request on the second CORESET or after stopping detecting the second device response corresponding to the BFR request on the second CORESET, continuing to detect control information on the second CORESET, wherein the control information on the second CORESET is used to control unicast uplink data transmission and/or downlink data transmission.

The processor is further used to: continue to detect the control information on the second CORESET according to instruction information transmitted by the second device or pre-configured information, wherein the control information on the second CORESET is used to control the unicast uplink data transmission and/or downlink data transmission.

Specifically, the processor is further used to: continue to, starting from the time slot N+K, detect control information used to schedule a preset type of signal on the first CORESET; and/or continue to, starting from the time slot N+K, detect control information with a preset format on the first CORESET; and/or continue to, starting from the time slot N+K, detect control information with a preset aggregation level on the first CORESET; and/or continue to, starting from the time slot N+K, detect control information corresponding to a preset search space on the first CORESET.

The implementations of the embodiments of the information transmission method on the first device side are applicable to the embodiments of the first device, and can also achieve a same technical effect.

Some embodiments of the present disclosure also provide a second device, including a memory, a processor, a transceiver, and a computer program stored in the memory and capable of being executed by the processor, wherein the processor is used to execute the computer program to implement steps of: performing a preset transmission scheme on control information on a first CORESET after receiving through the transceiver a BFR request transmitted by a first device.

The second device provided by some embodiments of the present disclosure performs the preset transmission scheme on the control information on the first CORESET after receiving the BFR request transmitted by the first device; this can to a certain extent prevent the system from not operating properly or prevent system performance degradation caused by behavior mismatch between a base station and a UE; and this can resolve the problem in the related art that after the UE detects a beam failure and reports a BFR request, transmission and reception of the control information on the existing CORESET is not defined, resulting in decrease in system performance.

Specifically, as shown in FIG. 4, a second device of some embodiments of the present disclosure includes: a processor 41; and a memory 43 connected with the processor 41 through a bus interface 42, and the memory 43 is used to store programs and data used by the processor 41 when performing operations. The processor 41 is used to call and execute the programs and the data stored in the memory 43 to perform the following process: performing a preset transmission scheme on control information on a first CORESET after receiving through the transceiver 44 a BFR request transmitted by a first device.

The transceiver 44 is connected with the bus interface 42 and is used to receive and transmit data under control of the processor 41.

It should be noted that in FIG. 4, bus architecture may include any quantity of interconnected buses and bridges, specifically linked together by various circuits such as one or more processors represented by the processor 41 and the memory represented by the memory 43. The bus architecture may also link together various other circuits such as peripheral devices, voltage regulators, and power management circuits, etc., which are well known in the art, and therefore, they will not be further described in this document. The bus interface is provided. The transceiver 44 may be a plurality of elements, that is, including a transmitter and a transceiver, and provides a unit for communicating with various other devices on a transmission medium. The processor 41 is responsible for managing the bus architecture and general processing, and the memory 43 may store data used by the processor 41 when performing operations.

It can be understood by a person skilled in the art that all or part of the steps to implement the above embodiments can be implemented by hardware, or can be implemented by related hardware being instructed through a computer program, and the computer program includes instructions to perform part or all of the steps of the above method; and the computer program may be stored in a readable storage medium, which may be any form of storage medium, such as a volatile memory or a non-volatile memory, or may include both the volatile and non-volatile memories.

The processor is further used to: stop transmitting the control information on the first CORESET after receiving the BFR request transmitted by the first device; or continue to transmit at least part of the control information on the first CORESET after receiving the BFR request transmitted by the first device.

Further, the processor is further used to: transmit control information on a second CORESET.

Specifically, the processor is further used to: start to transmit the control information on the second CORESET after receiving the BFR request transmitted by the first device.

In some embodiments of the present disclosure, the control information transmitted on the second CORESET includes first information that controls the first device to perform control information detection on the first CORESET.

Further, the processor is further used to: during a process of transmitting the control information on the second CORESET, configure the first information to instruct the first device to restart to detect the control information on the first CORESET, and to instruct the first device to start to or continue to transmit the control information on the first CORESET.

During a process of continuing to transmit at least part of the control information on the first CORESET after receiving the BFR request transmitted by the first device, it may cause termination of a BFR process. Some embodiments of the present disclosure provide the following two examples:

In a first example, the processor is further used to: during a process of continuing to transmit at least part of the control information on the first CORESET after receiving the BFR request transmitted by the first device, transmit, to the first device, control information that carries a second device response corresponding to the BFR request.

The second device response includes control information for reconfiguring a beam on the first CORESET, and/or includes control information that instructs the first device to stop detecting the control information on the second CORESET, and instructs the first device to switch to monitor control information of a third CORESET for transmitting the second device response.

Optionally, the processor is further used to: during the process of continuing to transmit at least part of the control information on the first CORESET after receiving the BFR request transmitted by the first device, transmit, to the first device on the first CORESET, the control information that carries the second device response corresponding to the BFR request.

Further, the processor is further used to: when transmitting to the first device the control information that carries the second device response corresponding to the BFR request or after transmitting to the first device the control information that carries the second device response corresponding to the BFR request, terminate an ongoing BFR process.

In a second example, the processor is further used to: during a process of continuing to transmit at least part of the control information on the first CORESET after receiving the BFR request transmitted by the first device, receive a BFR cancellation request transmitted by the first device, and terminate an ongoing BFR process according to the BFR cancellation request.

Further, the processor is further used to: before terminating the ongoing BFR process, transmit control information on a second CORESET; correspondingly, the processor is further used to: stop transmitting the second device response corresponding to the BFR request on the second CORESET.

Further, the processor is further used to: when stopping transmitting the second device response corresponding to the BFR request on the second CORESET or after stopping transmitting the second device response corresponding to the BFR request on the second CORESET, transmit instruction information to the first device to instruct the first device to continue to detect the control information on the second CORESET, wherein the control information on the second CORESET is used to control unicast uplink data transmission and/or downlink data transmission.

Specifically, the processor is further used to: after receiving the BFR request transmitted by the first device, continue to transmit control information used to schedule a preset type of signal on the first CORESET; and/or after receiving the BFR request transmitted by the first device, continue to transmit control information with a preset format on the first CORESET; and/or after receiving the BFR request transmitted by the first device, continue to transmit control information with a preset aggregation level on the first CORESET; and/or after receiving the BFR request transmitted by the first device, continue to transmit control information corresponding to a preset search space on the first CORESET.

The implementations of embodiments of the information transmission method on the second device side are all applicable to the embodiments of the second device, and can also achieve the same technical effect.

Some embodiments of the present disclosure also provide a computer-readable storage medium, which includes a computer program stored therein, wherein the computer program is used to be executed by a processor, to implement steps of the above-mentioned information transmission method at the first device side.

The implementations of embodiments of the information transmission method on the first device side are all applicable to the embodiments of the computer-readable storage medium, and can also achieve the same technical effect.

Some embodiments of the present disclosure also provide a computer-readable storage medium, which includes a computer program stored therein, wherein the computer program is used to be executed by a processor, to implement steps of the above-mentioned information transmission method at the second device side.

The implementations of the embodiments of the information transmission method on the second device side are all applicable to the embodiments of the computer-readable storage medium, and can also achieve the same technical effect.

Some embodiments of the present disclosure also provide an information transmission apparatus 50 applied to a first device, as shown in FIG. 5, including: a first processing module 51, used to transmit a BFR request to a second device in time slot N, and perform a preset reception scheme on control information on a first CORESET starting from time slot N+K, wherein N is an integer greater than or equal to 0, and K is an integer greater than or equal to 0.

The information transmission apparatus provided by some embodiments of the present disclosure transmits the BFR request to the second device in the time slot N, and performs the preset reception scheme on the control information on the first CORESET starting from the time slot N+K; wherein, N is an integer greater than or equal to 0, and K is an integer greater than or equal to 0; this can to a certain extent prevent the system from not operating properly or prevent system performance degradation caused by behavior mismatch between a base station and a UE; and this can resolve the problem in the related art that after the UE detects a beam failure and reports a BFR request, transmission and reception of the control information on the existing CORESET is not defined, resulting in decrease in system performance.

The first processing module includes: a first processing submodule 511, used to: stop, starting from the time slot N+K, detecting the control information on the first CORESET; or continue to, starting from the time slot N+K, detect at least part of the control information on the first CORESET.

Further, the information transmission apparatus further includes: a first detection module 52, used to: when transmitting the BFR request to the second device in the time slot N or after transmitting the BFR request to the second device in the time slot N, start to detect control information transmitted on a second CORESET.

In some embodiments of the present disclosure, the control information transmitted on the second CORESET includes first information that controls the first device to perform control information detection on the first CORESET.

When the first information instructs the first device to restart to detect the control information on the first CORESET, the information transmission apparatus further includes: a second detection module, used to: after stopping starting from the time slot N+K detecting the control information on the first CORESET, restart to detect the control information on the first CORESET after properly decoding the first information.

During a process of continuing to, starting from the time slot N+K, detect at least part of the control information on the first CORESET, it may cause termination of a BFR process. Some embodiments of the present disclosure provide the following two examples:

In a first example, the information transmission apparatus further includes: a second processing module 53, used to: during a process of continuing to detect at least part of the control information on the first CORESET, terminate an ongoing BFR process when a second device response corresponding to the BFR request is detected.

The second device response includes control information for reconfiguring a beam on the first CORESET, and/or includes control information that instructs the first device to stop detecting the control information on the second CORESET, and instructs the first device to switch to monitor control information of a third CORESET for transmitting the second device response.

Optionally, the second processing module 53 is further used to: during a process of continuing to detect at least part of the control information on the first CORESET, when the second device response corresponding to the BFR request is detected in the control information on the first CORESET, terminate the ongoing BFR process.

In the case that the control information transmitted on the second CORESET is being detected, the second device response includes a latter kind of control information (the control information that instructs the first device to stop detecting the control information on the second CORESET, and instructs the first device to switch to monitor the third CORESET for transmitting the second device response).

In a second example, the information transmission apparatus further includes: a third processing module 54, used to: during a process of continuing to detect at least part of the control information on the first CORESET, when a beam corresponding to the first CORESET has been recovered before the BFR process is completed, terminate an ongoing BFR process.

Further, the information transmission apparatus further includes: a first transmission module 55, used to: when terminating the ongoing BFR process or after terminating the ongoing BFR process, transmit a BFR cancellation request to the second device.

The beam corresponding to the first CORESET is determined to have been recovered when at least one of the following conditions is met: a condition that a preset quantity of pieces of control information is received on the first CORESET; a condition that it is detected quality of at least one beam corresponding to at least one CORESET or at least one beam corresponding to a preset quantity of CORESETs meets a preset reliability weight.

Specifically, an operation of terminating the ongoing BFR process includes: stopping detecting the second device response corresponding to the BFR request on the second CORESET; and/or stopping a timer for an uplink signal transmission, wherein the uplink signal transmission is used to notify the second device of a beam failure event.

In the case that the control information transmitted on the second CORESET is being detected, the step of terminating the ongoing BFR process includes the former kind of operation (stopping detecting the second device response corresponding to the BFR request on the second CORESET).

Further, the information transmission apparatus further includes: a third detection module 56, used to: when stopping detecting the second device response corresponding to the BFR request on the second CORESET or after stopping detecting the second device response corresponding to the BFR request on the second CORESET, continue to detect control information on the second CORESET, wherein the control information on the second CORESET is used to control unicast uplink data transmission and/or downlink data transmission.

The third detection module 56 includes: a first detection submodule 561, used to: continue to detect the control information on the second CORESET according to instruction information transmitted by the second device or preconfigured information, wherein the control information on the second CORESET is used to control the unicast uplink data transmission and/or downlink data transmission.

Specifically, the first processing submodule is further used to: continue to, starting from the time slot N+K, detect control information used to schedule signal with at least one preset type on the first CORESET; and/or continue to, starting from the time slot N+K, detect control information with at least one preset format on the first CORESET; and/or continue to, starting from the time slot N+K, detect control information with at least one preset aggregation level on the first CORESET; and/or continue to, starting from the time slot N+K, detect control information corresponding to at least one preset search space on the first CORESET.

The implementations of the embodiments of the information transmission method on the first device side are all applicable to the embodiments of the information transmission apparatus, and can also achieve the same technical effect.

Figure 6:
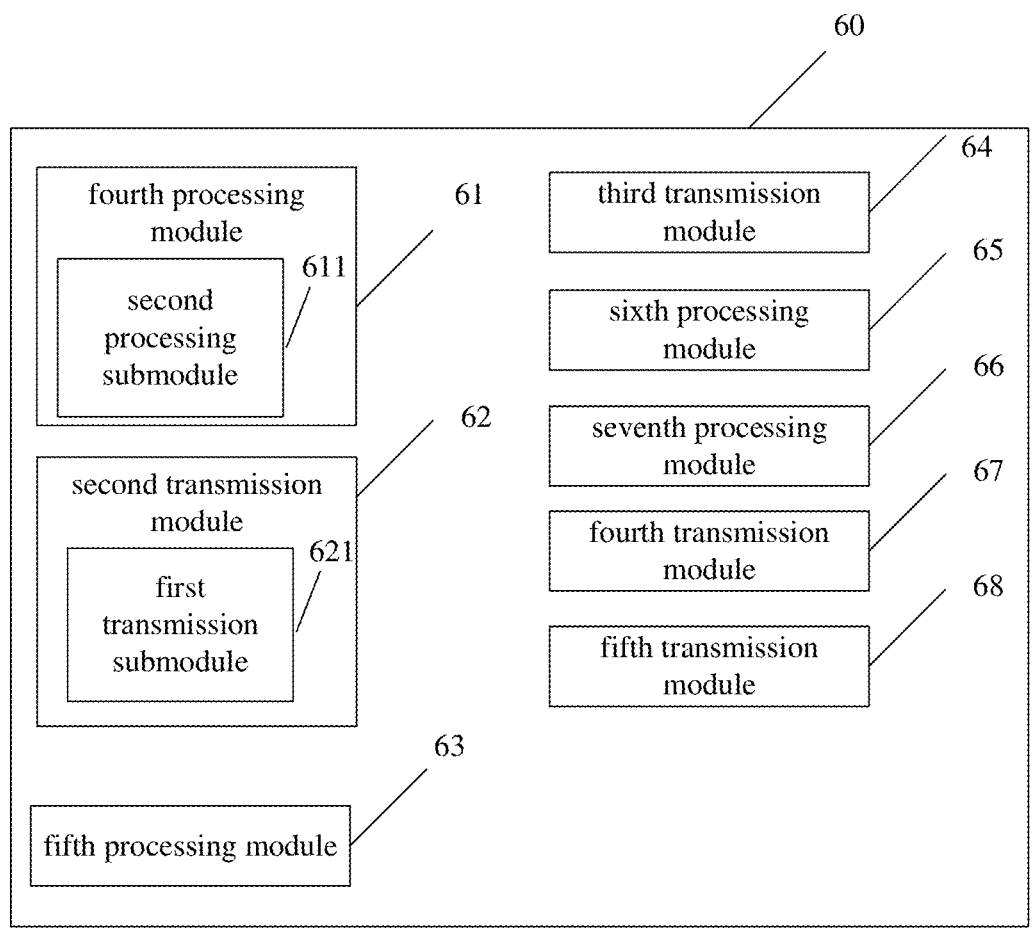
FIG. 6 is a second schematic structural diagram of an information transmission apparatus according to some embodiments of the present disclosure.

Some embodiments of the present disclosure also provide an information transmission apparatus 60 applied to a second device, as shown in FIG. 6, including: a fourth processing module 61, used to perform a preset transmission scheme on control information on a first CORESET after receiving a BFR request transmitted by a first device.

The information transmission apparatus provided by some embodiments of the present disclosure performs the preset transmission scheme on the control information on the first CORESET after receiving the BFR request transmitted by the first device; this can to a certain extent prevent the system from not operating properly or prevent system performance degradation caused by behavior mismatch between a base station and a UE; and this can resolve the problem in the related art that after the UE detects a beam failure and reports a BFR request, transmission and reception of the control information on the existing CORESET is not defined, resulting in decrease in system performance.

The fourth processing module 61 includes: a second processing submodule 611, used to: stop transmitting the control information on the first CORESET after receiving the BFR request transmitted by the first device; or continue to transmit at least part of the control information on the first CORESET after receiving the BFR request transmitted by the first device.

Further, the information transmission apparatus further includes: a second transmission module 62, used to transmit control information on a second CORESET.

Specifically, the second transmission module 62 includes: a first transmission submodule 621, used to: start to transmit the control information on the second CORESET after receiving the BFR request transmitted by the first device.

In some embodiments of the present disclosure, the control information transmitted on the second CORESET includes first information that controls the first device to perform control information detection on the first CORESET.

Further, the information transmission apparatus further includes: a fifth processing module 63, used to: during a process of transmitting the control information on the second CORESET, configure the first information to instruct the first device to restart to detect the control information on the first CORESET, and to instruct the first device to start to or continue to transmit the control information on the first CORESET.

During a process of continuing to transmit at least part of the control information on the first CORESET after receiving the BFR request transmitted by the first device, it may cause termination of a BFR process. Some embodiments of the present disclosure provide the following two examples:

In a first example, the information transmission apparatus further includes: a third transmission module 64, used to: during a process of continuing to transmit at least part of the control information on the first CORESET after receiving the BFR request transmitted by the first device, transmit, to the first device, control information that carries a second device response corresponding to the BFR request.

The second device response includes control information for reconfiguring a beam on the first CORESET, and/or includes control information that instructs the first device to stop detecting the control information on the second CORESET, and instructs the first device to switch to monitor control information of a third CORESET for transmitting the second device response.

Optionally, the third transmission module 64 is further used to: during the process of continuing to transmit at least part of the control information on the first CORESET after receiving the BFR request transmitted by the first device, transmit, to the first device on the first CORESET, the control information that carries the second device response corresponding to the BFR request.

Further, the information transmission apparatus further includes: a sixth processing module 65, used to: when transmitting to the first device the control information that carries the second device response corresponding to the BFR request or after transmitting to the first device the control information that carries the second device response corresponding to the BFR request, terminate an ongoing BFR process.

In a second example, the information transmission apparatus further includes: a seventh processing module 66, used to: during a process of continuing to transmit at least part of the control information on the first CORESET after receiving the BFR request transmitted by the first device, receive a BFR cancellation request transmitted by the first device, and terminate an ongoing BFR process according to the BFR cancellation request.

Further, the information transmission apparatus further includes: a fourth transmission module 67, used to: before terminating the ongoing BFR process, transmit control information on a second CORESET; correspondingly, the operation of terminating the ongoing BFR process includes: stopping transmitting the second device response corresponding to the BFR request on the second CORESET.

Further, the information transmission apparatus further includes: a fifth transmission module 68, used to: when stopping transmitting the second device response corresponding to the BFR request on the second CORESET or after stopping transmitting the second device response corresponding to the BFR request on the second CORESET, transmit instruction information to the first device to instruct the first device to continue to detect the control information on the second CORESET, wherein the control information on the second CORESET is used to control unicast uplink data transmission and/or downlink data transmission.

Specifically, the second processing submodule is further used to: after receiving the BFR request transmitted by the first device, continue to transmit control information used to schedule signal with at least one preset type on the first CORESET; and/or after receiving the BFR request transmitted by the first device, continue to transmit control information with at least one preset format on the first CORESET; and/or after receiving the BFR request transmitted by the first device, continue to transmit control information with at least one preset aggregation level on the first CORESET; and/or after receiving the BFR request transmitted by the first device, continue to transmit control information corresponding to at least one preset search space on the first CORESET.

The implementations of the embodiments of the information transmission method on the second device side are all applicable to the embodiments of the information transmission apparatus, and can also achieve the same technical effect.

It should be noted that many of functional components described in this specification are called modules/submodules, so as to emphasize independence of their implementation more particularly.

In some embodiments of the present disclosure, the modules/submodules may be implemented in software, so as to be executed by various types of processors. For example, an identified executable code module may include one or more physical or logical blocks of computer instructions, which may be constructed as objects, procedures, or functions, for example. Nevertheless, executable code of the identified module does not need to be physically located together, but may include different instructions stored in different bits. When these instructions are logically combined together, they constitute a module and achieve a specified purpose of the module.

In fact, the executable code module may be a single instruction or many instructions, and may even be distributed on multiple different code segments, among different programs, and across multiple memory devices. Likewise, operational data can be identified within the module, and can be implemented in any appropriate form and organized within any suitable type of data structure. The operation data may be collected as a single data set, or may be distributed in different locations (including on different storage devices), and may exist, at least in part, only as an electronic signal on a system or network.

When the module is implemented by software, considering process level in related art, the module implemented in software may alternately implemented by a person skilled in the art building a corresponding hardware circuit to achieve corresponding functions, when not considering the cost. The hardware circuit includes a conventional Very Large Scale Integration (VLSI) circuit or a gate array and related semiconductors such as logic chips, transistors or other discrete elements. The module may also be implemented with programmable hardware devices, such as field programmable gate arrays, programmable array logic, programmable logic devices, and so on.

The above are optional embodiments of the present disclosure. It should be appreciated that a person of ordinary skill in the art may make further improvements and modifications without departing from principles of the present disclosure, and these improvements and modifications should also be considered to fall within the protection scope of this disclosure.

What is claimed is:

1. An information transmission method applied to a first device, comprising:
   transmitting a Beam Failure Recovery (BFR) request to a second device in time slot N, and performing a preset reception scheme on control information on a first Control Resource Set (CORESET) starting from time slot N+K;
   wherein N is a first integer greater than or equal to 0, and K is a second integer greater than or equal to 0,
   wherein performing the preset reception scheme on the control information on the first CORESET starting from the time slot N+K comprises: stopping, starting from the time slot N+K, detecting the control information on the first CORESET; or continuing to, starting from the time slot N+K, detect only a part of the control information on the first CORESET; and/or
   wherein when transmitting the BFR request to the second device in the time slot N or after transmitting the BFR request to the second device in the time slot N, the information transmission method further comprises: starting to detect the control information transmitted on a second CORESET, and wherein the control information transmitted on the second CORESET comprises first information that controls the first device to perform the control information detection on the first CORESET.

2. The information transmission method according to claim 1, wherein
   during a first process of continuing to detect the part of the control information on the first CORESET, the information transmission method further comprises:
   terminating an ongoing BFR process in response to that a second device response corresponding to the BFR request is detected; and/or
   during the first process of continuing to detect the part of the control information on the first CORESET, the information transmission method comprises: in response to that a beam corresponding to the first CORESET has been recovered before the BFR process is completed, terminating the ongoing BFR process.

3. The information transmission method according to claim 2, wherein
in response to that that the control information transmitted on the second CORESET is being detected, the second device response comprises the control information that instructs the first device to stop detecting the control information on the second CORESET, and instructs the first device to monitor a third CORESET, wherein the third CORSET is used to transmit the second device response.

4. The information transmission method according to claim 2, wherein in response to that that the control information transmitted on the second CORESET is being detected, terminating the ongoing BFR process comprises:
stopping detecting the second device response on the second CORESET, wherein the second device response corresponds to the BFR request,
when stopping detecting the second device response corresponding to the BFR request on the second CORESET or after stopping detecting the second device response corresponding to the BFR request on the second CORESET, the information transmission method further comprises:
continuing to detect the control information on the second CORESET, and the control information on the second CORESET being used to control unicast uplink data transmission and/or downlink data transmission.

5. The information transmission method according to claim 1, wherein continuing to, starting from the time slot N+K, detect the part of the control information on the first CORESET comprises at least one of:
continuing to, starting from the time slot N+K, detect the control information used to schedule signal with at least one preset type on the first CORESET;
continuing to, starting from the time slot N+K, detect the control information with at least one preset format on the first CORESET;
continuing to, starting from the time slot N+K, detect the control information with at least one preset aggregation level on the first CORESET; and
continuing to, starting from the time slot N+K, detect the control information corresponding to at least one preset search space on the first CORESET.

6. An information transmission method applied to a second device, comprising:
performing a preset transmission scheme on control information on a first CORESET after receiving a BFR request transmitted by a first device,
wherein performing the preset transmission scheme on the control information on the first CORESET after receiving the BFR request information transmitted by the first device comprise: stopping transmitting the control information on the first CORESET after receiving the BFR request transmitted by the first device; or continuing to transmit only a part of the control information on the first CORESET after receiving the BFR request transmitted by the first device; and/or
the information transmission method further comprises: transmitting the control information on a second CORESET, wherein transmitting the control information on the second CORESET comprises: starting to transmit the control information on the second CORESET after receiving the BFR request transmitted by the first device, and the control information transmitted on the second CORESET comprises first information that controls the first device to perform a control information detection on the first CORESET.

7. The information transmission method according to claim 6, wherein during a process of transmitting the control information on the second CORESET, the information transmission method comprises:
configuring the first information to instruct the first device to restart to detect the control information on the first CORESET, and to instruct the first device to start to or continue to transmit the control information on the first CORESET.

8. The information transmission method according to claim 6, wherein during a first process of continuing to transmit the part of the control information on the first CORESET after receiving the BFR request transmitted by the first device, the information transmission method comprises:
transmitting, to the first device, the control information that carries a second device response corresponding to the BFR request.

9. The information transmission method according to claim 8, wherein when transmitting to the first device the control information that carries the second device response corresponding to the BFR request or after transmitting to the first device the control information that carries the second device response corresponding to the BFR request, the information transmission method further comprises:
terminating an ongoing BFR process.

10. The information transmission method according to claim 8, wherein
transmitting to the first device the control information that carries the second device response corresponding to the BFR request comprises: transmitting, to the first device on the first CORESET, the control information that carries the second device response corresponding to the BFR request; and/or
the second device response comprises the control information for reconfiguring a beam on the first CORESET; and/or the second device response comprises the control information that instructs the first device to stop detecting the control information on a second CORESET, and instructs the first device to monitor a third CORESET, wherein the third CORSET is used to transmit the second device response.

11. The information transmission method according to claim 9, wherein before terminating the ongoing BFR process, the information transmission method further comprises:
transmitting the control information on a second CORESET,
terminating the ongoing BFR process comprises:
stopping transmitting the second device response on the second CORESET, wherein the second device response corresponds to the BFR request,
when stopping transmitting the second device response corresponding to the BFR request on the second CORESET or after stopping transmitting the second device response corresponding to the BFR request on the second CORESET, the information transmission method further comprises:
transmitting instruction information to the first device to instruct the first device to continue to detect the control information on the second CORESET, and the control information on the second CORESET being used to control unicast uplink data transmission and/or downlink data transmission.

12. The information transmission method according to claim 6, wherein continuing to transmit the part of the control information on the first CORESET after receiving the BFR request transmitted by the first device comprises at least one of:
- after receiving the BFR request transmitted by the first device, continuing to transmit the control information used to schedule signal with at least one preset type on the first CORESET;
- after receiving the BFR request transmitted by the first device, continuing to transmit the control information with at least one preset format on the first CORESET;
- after receiving the BFR request transmitted by the first device, continuing to transmit the control information with at least one preset aggregation level on the first CORESET; and
- after receiving the BFR request transmitted by the first device, continuing to transmit the control information corresponding to at least one preset search space on the first CORESET.

13. A first device, comprising: a memory, a processor, a transceiver, and a computer program stored in the memory and capable of being executed by the processor, wherein the processor is used to execute the computer program to implement steps of:
- transmitting a BFR request to a second device in time slot N through the transceiver, and performing a preset reception scheme on the control information on a first CORESET starting from time slot N+K;
- wherein N is a first integer greater than or equal to 0, and K is a second integer greater than or equal to 0,
- wherein the processor is further used to: stop, starting from the time slot N+K, detecting the control information on the first CORESET; or continue to, starting from the time slot N+K, detect only a part of the control information on the first CORESET; and/or
- wherein the processor is further used to: when transmitting the BFR request to the second device in the time slot N or after transmitting the BFR request to the second device in the time slot N, start to detect the control information transmitted on a second CORESET, and wherein the control information transmitted on the second CORESET comprises first information that controls the first device to perform a control information detection on the first CORESET.

14. The first device according to claim 13, wherein the processor is further used to:
- during a first process of continuing to detect the part of the control information on the first CORESET, terminate an ongoing BFR process when a second device response corresponding to the BFR request is detected; and/or
- the processor is further used to: continue to, starting from the time slot N+K, detect the control information used to schedule signal with at least one preset type on the first CORESET; and/or continue to, starting from the time slot N+K, detect the control information with at least one preset format on the first CORESET; and/or continue to, starting from the time slot N+K, detect the control information with at least one preset aggregation level on the first CORESET; and/or continue to, starting from the time slot N+K, detect the control information corresponding to at least one preset search space on the first CORESET.

15. A second device, comprising: a memory, a processor, a transceiver, and a computer program stored in the memory and capable of being executed by the processor, wherein the processor is used to execute the computer program to implement the information transmission method according to claim 6.

* * * * *